US007101120B2

(12) United States Patent
Jurkovich

(10) Patent No.: US 7,101,120 B2
(45) Date of Patent: Sep. 5, 2006

(54) APPARATUS AND METHOD FOR CONTROLLING FLUID FLOWS FOR PNEUMATIC CONVEYING

(76) Inventor: John C. Jurkovich, 6821 Oaklawn Ave., Edina, MN (US) 55435

( * ) Notice: Subject to any disclaimer, the term of this patent is extended or adjusted under 35 U.S.C. 154(b) by 0 days.

(21) Appl. No.: 10/943,087

(22) Filed: Sep. 15, 2004

(65) Prior Publication Data

US 2006/0056924 A1 Mar. 16, 2006

(51) Int. Cl.
*B65G 53/66* (2006.01)
(52) U.S. Cl. .......................................... 406/12; 406/14
(58) Field of Classification Search ................... 406/12, 406/14, 30, 21, 33
See application file for complete search history.

(56) References Cited

U.S. PATENT DOCUMENTS

| | | | |
|---|---|---|---|
| 4,014,577 A | 3/1977 | Clancy et al. | |
| 4,101,175 A | 7/1978 | Kull | |
| 4,490,077 A * | 12/1984 | Shimada et al. | ............... 406/14 |
| 4,586,852 A * | 5/1986 | Oda et al. | ..................... 406/14 |
| 4,821,467 A * | 4/1989 | Woodson et al. | ............... 451/2 |
| 4,830,545 A * | 5/1989 | Salter et al. | ................... 406/12 |
| 4,838,738 A * | 6/1989 | Salter et al. | ................... 406/14 |
| 4,863,316 A * | 9/1989 | Gianella et al. | ............... 406/14 |
| 5,098,194 A * | 3/1992 | Kuo et al. | .................... 366/144 |
| 5,350,257 A | 9/1994 | Newbolt et al. | |
| 5,813,801 A | 9/1998 | Newbolt et al. | |
| 5,880,378 A | 3/1999 | Behring, II | |
| 6,234,666 B1 * | 5/2001 | Kolb | ......................... 366/279 |
| 2003/0206776 A1 | 11/2003 | Pearson | |

FOREIGN PATENT DOCUMENTS

| | | |
|---|---|---|
| EP | 0210873 A1 | 2/1987 |
| EP | 0210873 B1 | 2/1987 |
| WO | WO-08501930 A1 | 5/1985 |

OTHER PUBLICATIONS

Unknown Author (Cyclonaire), "C-Series Conveyor", (Unknown date) Internet web-address: http://www.cyclonaire.com/productresults.cfm?ID=10.
Unknown Author (Cyclonaire), "Air Injector—Convey Line", (Unknown date) Internet web-address: http://www.cyclonaire.com/productresults.cfm?ID=6.
Unknown Author (Cyclonaire), "Turbo Inductor", (Unknown date) Internet web-address: http://www.cyclonaire.com/productresults.cfm?ID=31.

(Continued)

*Primary Examiner*—James R. Bidwell
(74) *Attorney, Agent, or Firm*—Charles A. Lemaire; Lemaire Patent Law Firm, P.L.L.C.

(57) ABSTRACT

A system and method providing automatic adjustment of flows used to empty dry material from a pressure pot or hopper. In some embodiments, based on pressure increases in the conveying line that receives the dry material, the flow of conveying-fluid to the conveying line automatically increases and/or the flow of pressurization fluid to the hopper that assists pushing dry material out of the hopper automatically decreases and/or rotary-valve speed controlling dry-material rates from the hopper automatically slows. In some embodiments, one or more discretely or continuously adjustable critical-flow venturies (CFVs) automatically adjust mass flow of fluid based on, e.g., pintle position set by a pneumatic cylinder controlled by conveying-line pressure. Each pintle moves in and out of its CFV throat, adjusting throat area, thus setting the rate of flow. In some embodiments, pintle cross-sectional area is linearly proportional to distance from the tip of the pintle.

70 Claims, 26 Drawing Sheets

OTHER PUBLICATIONS

Unknown Author (Dynamic Air), "Dense Phase Conventional Concept", (Unknown date) Internet web-address: http://www.dynamicair.com/systems/conventional.html.

Unknown Author (Dynamic Air), "Dense Phase Fluidizing Concept", (Unknown date) Internet web-address: http://www.dynamicair.com/systems/fluidizing.html.

Unknown Author (Dynamic Air), "Dense Phase Full Line Concept—Batch", (Unknown date) Internet web-address: http://www.dynamicair.com/systems/fullbatch.html.

Unknown Author (Dynamic Air), "Dense Phase Full Line Concept—Continuous", (Unknown date) Internet web-address: http://www.dynamicair.com/systems/fullcontinuous.html.

Unknown Author (NOL-TEC), "Dense Phase", From: Powder & Bulk Engineering (Mar. 1997); Internet web-address: http://www.nol-tec.com/products-services/bulk-material-handing/dense_phase.asp.

Unknown Author (Flow Dynamics), "Sonic Nozzle / Venturi", (Unknown date) Internet web-address: http://www.flow-dynamics.com/sonicventuriphotos.htm.

Unknown Author (Fluid Systems, Inc.), "Sonic Nozzles", (Unknown date) Internet web-address: http://flowsystemsinc.com/sn001.htm.

Unknown Author (Flowmaxx Engineering), "Sonic Nozzles", (Unknown date) Internet web-address: http://www.flowmaxx.com/sonic.htm, sonic nozzle operation.

Unknown Author (Whirl-Air), "Whirl-air dense phase", (2001). Internet web-address: http://www.whirlair.com/Dense%20Pressure.htm.

Unknown Author, "Fox Adjustable Area Critical Flow Venturi", (Unknown date). Unknown source.

* cited by examiner

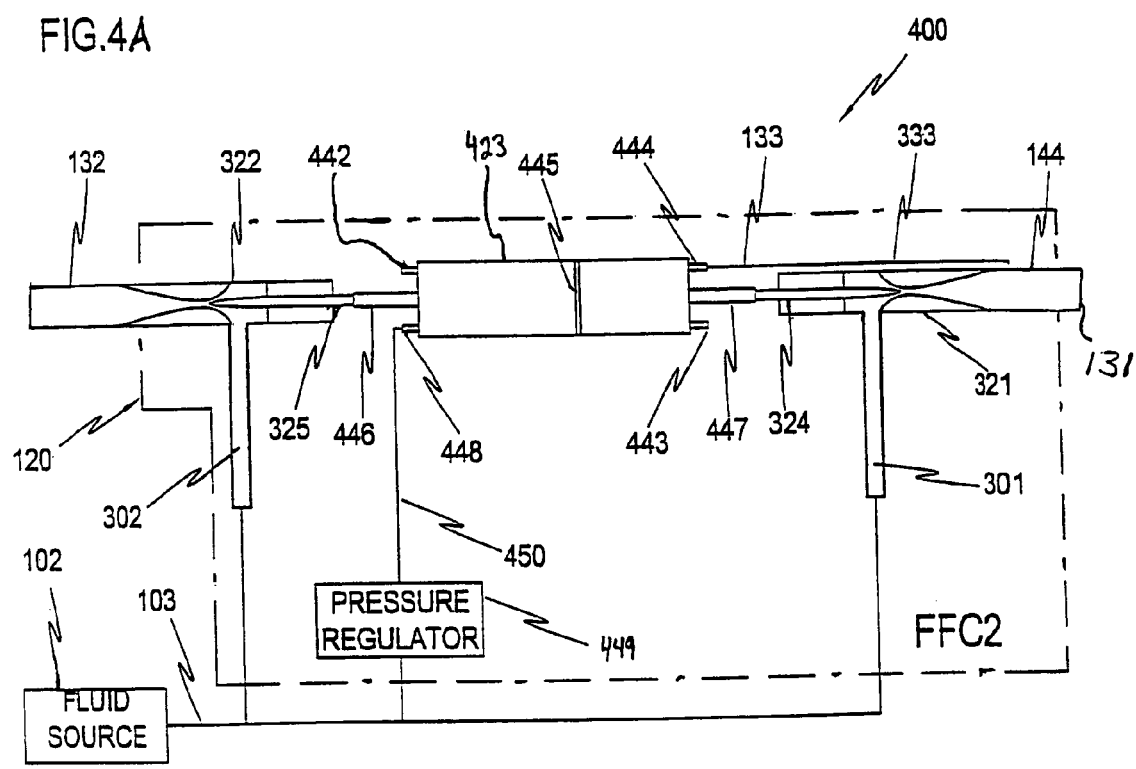

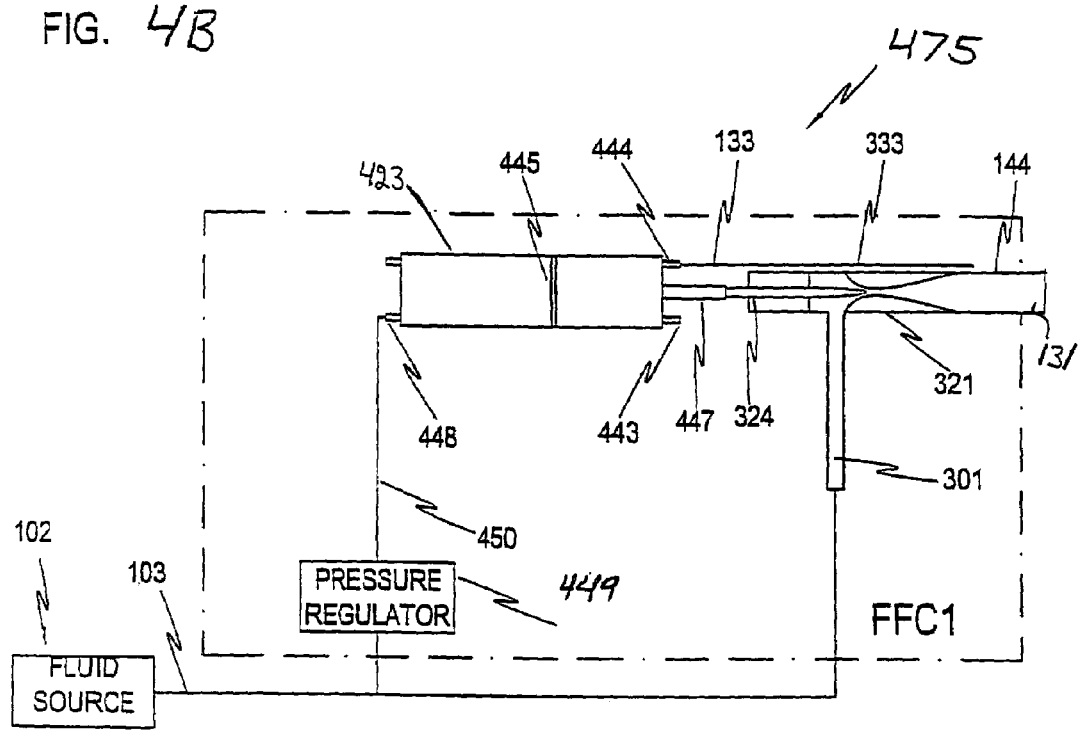

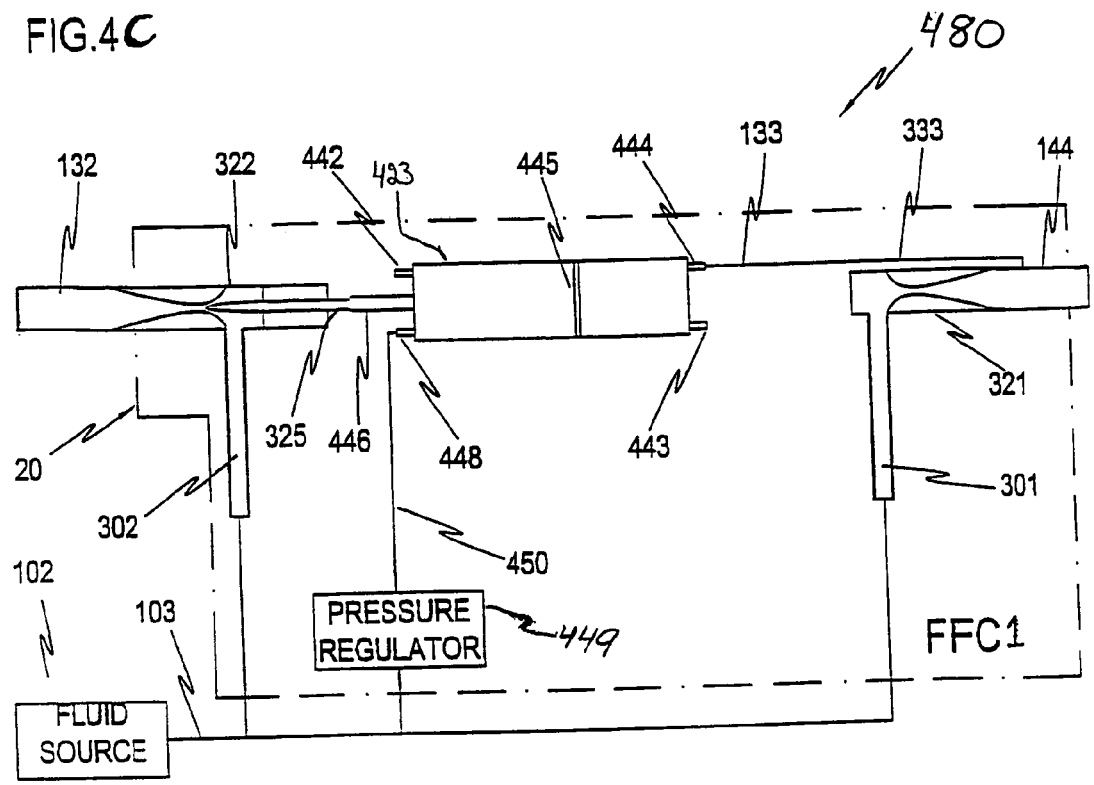

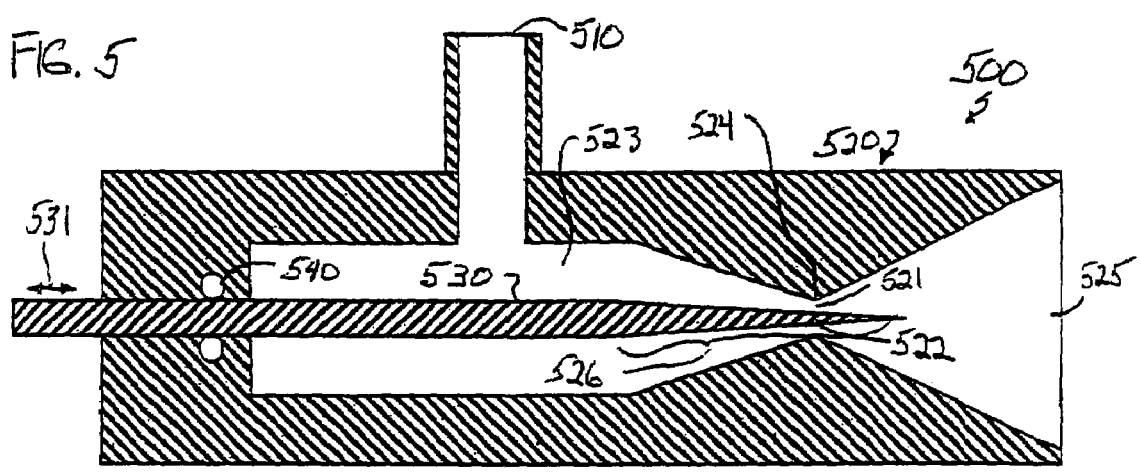

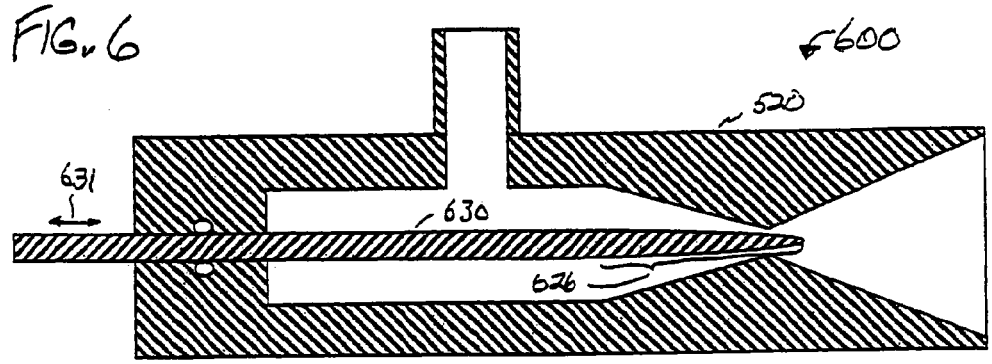
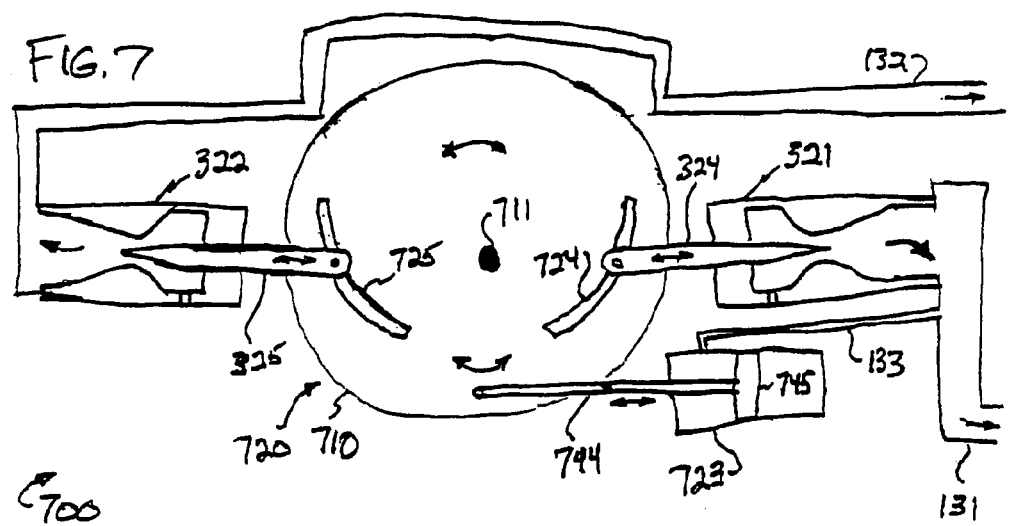

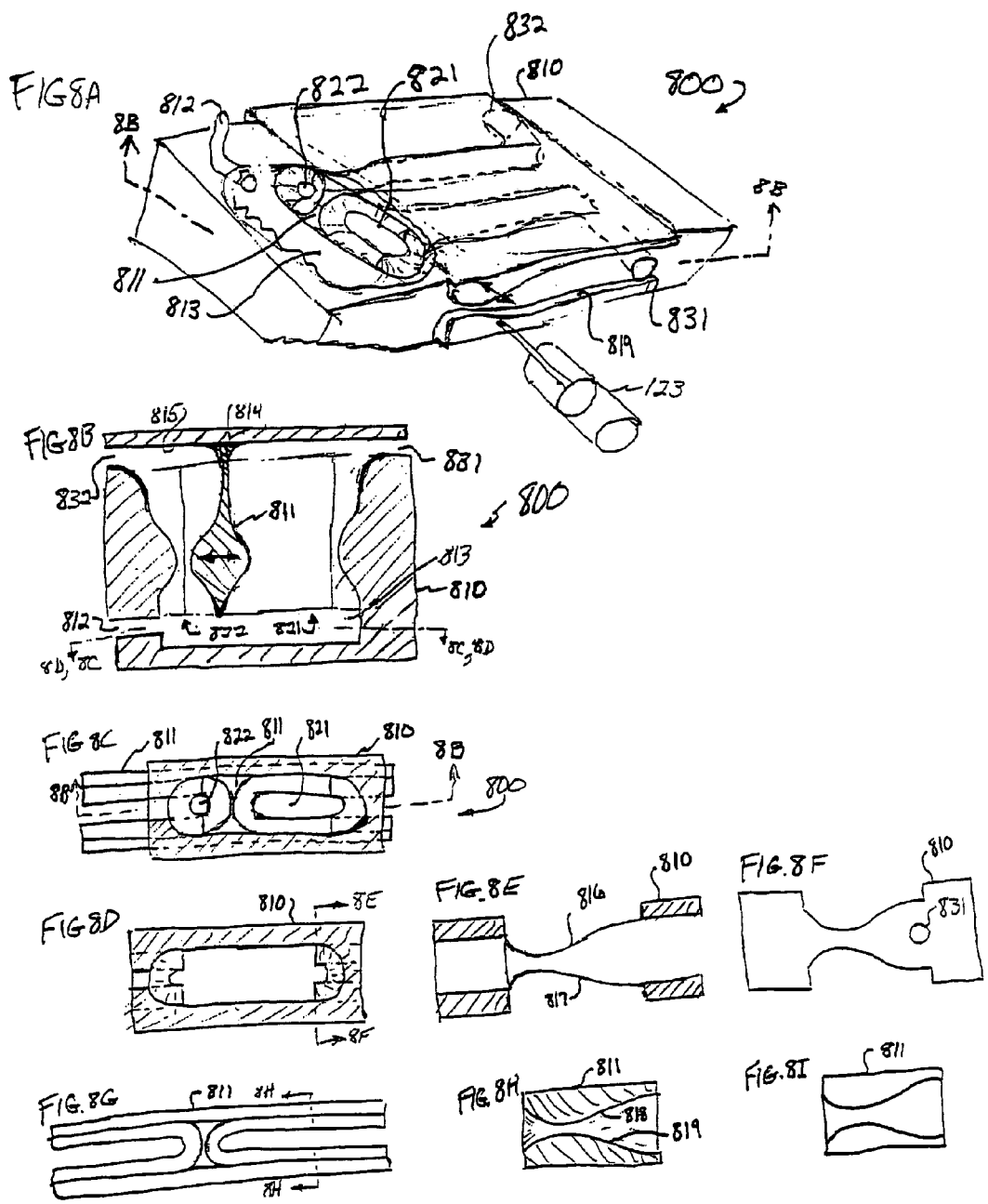

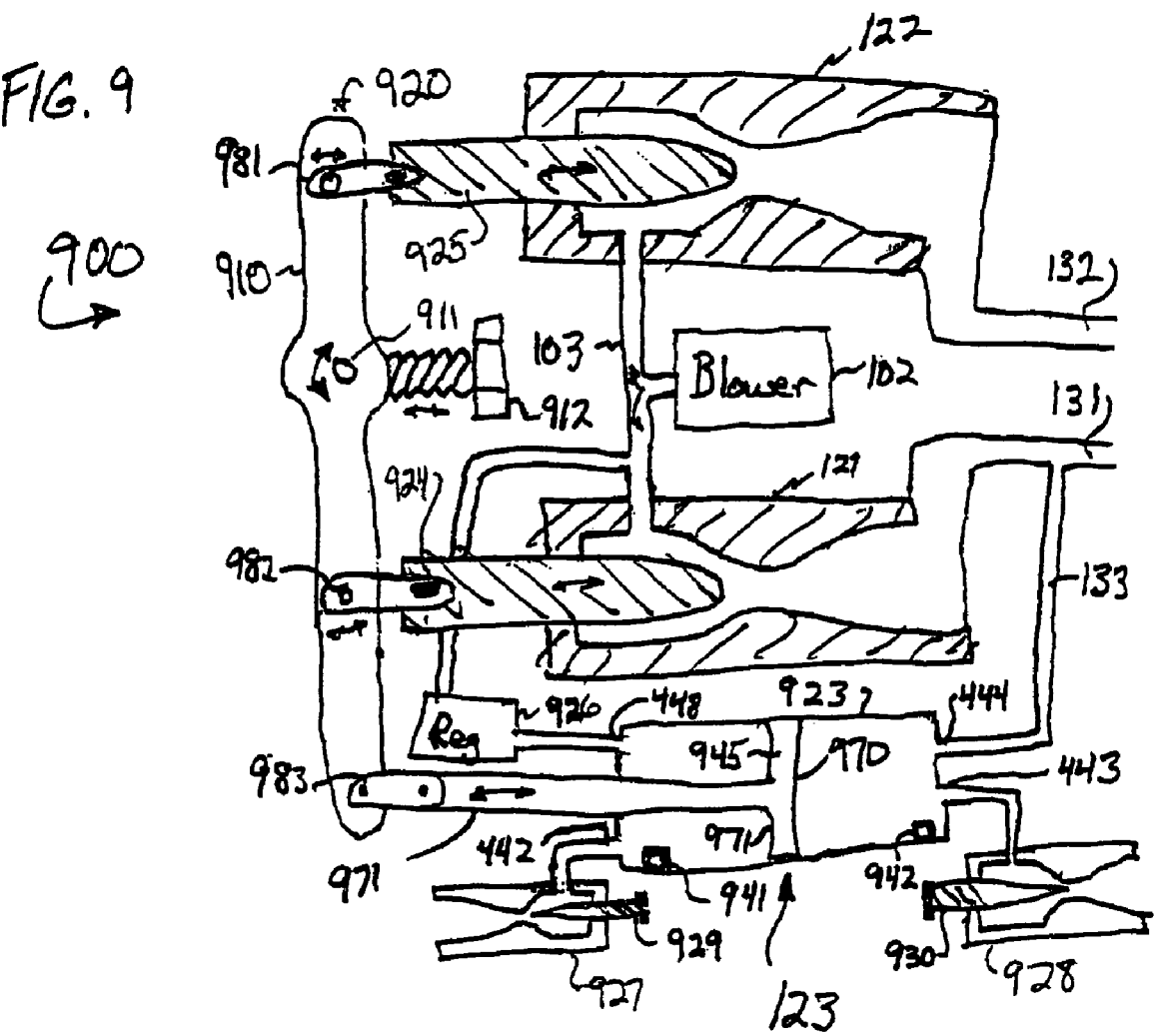

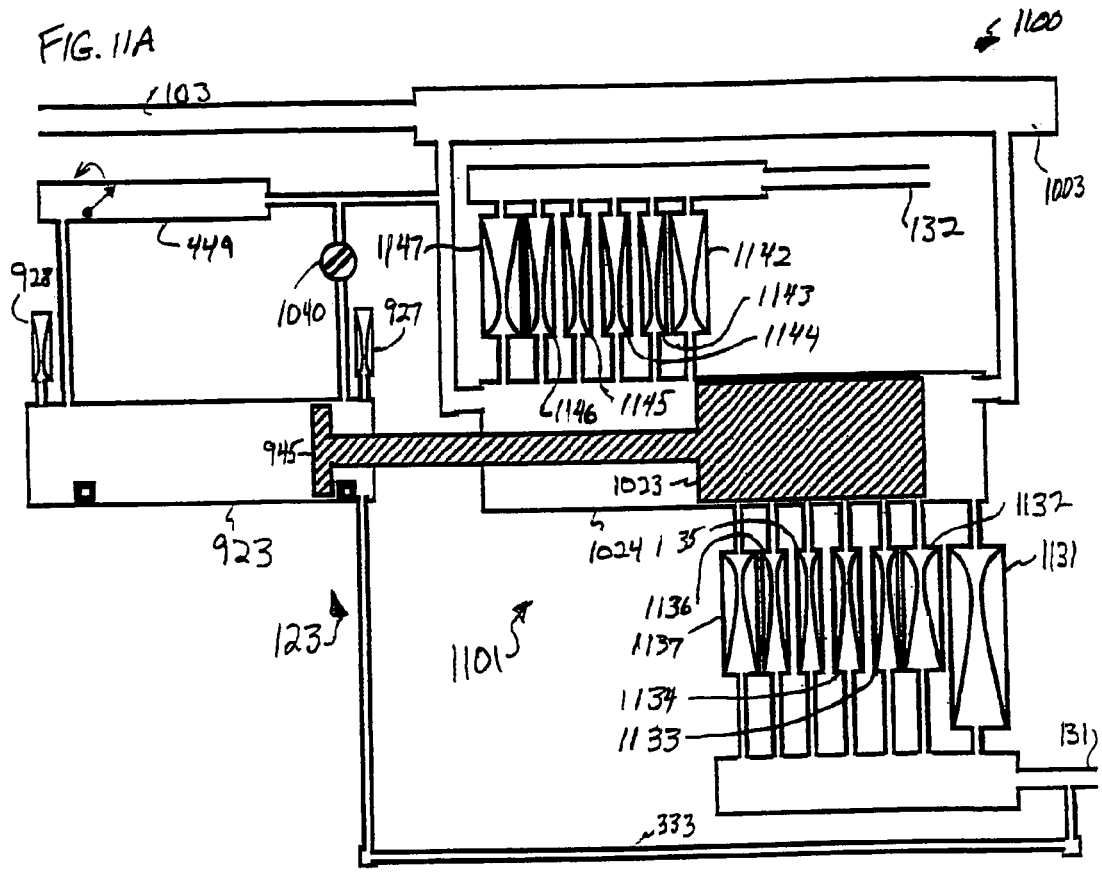
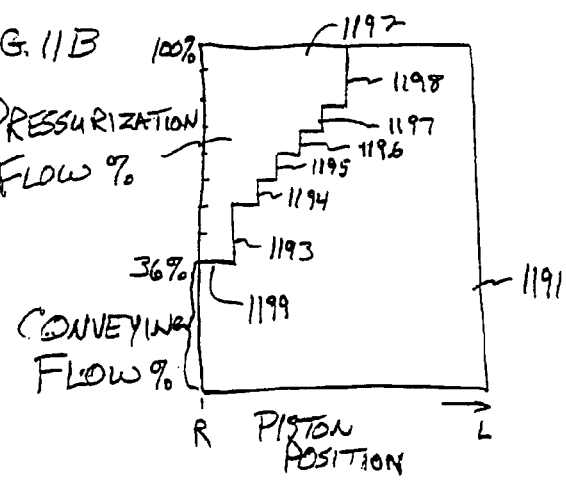

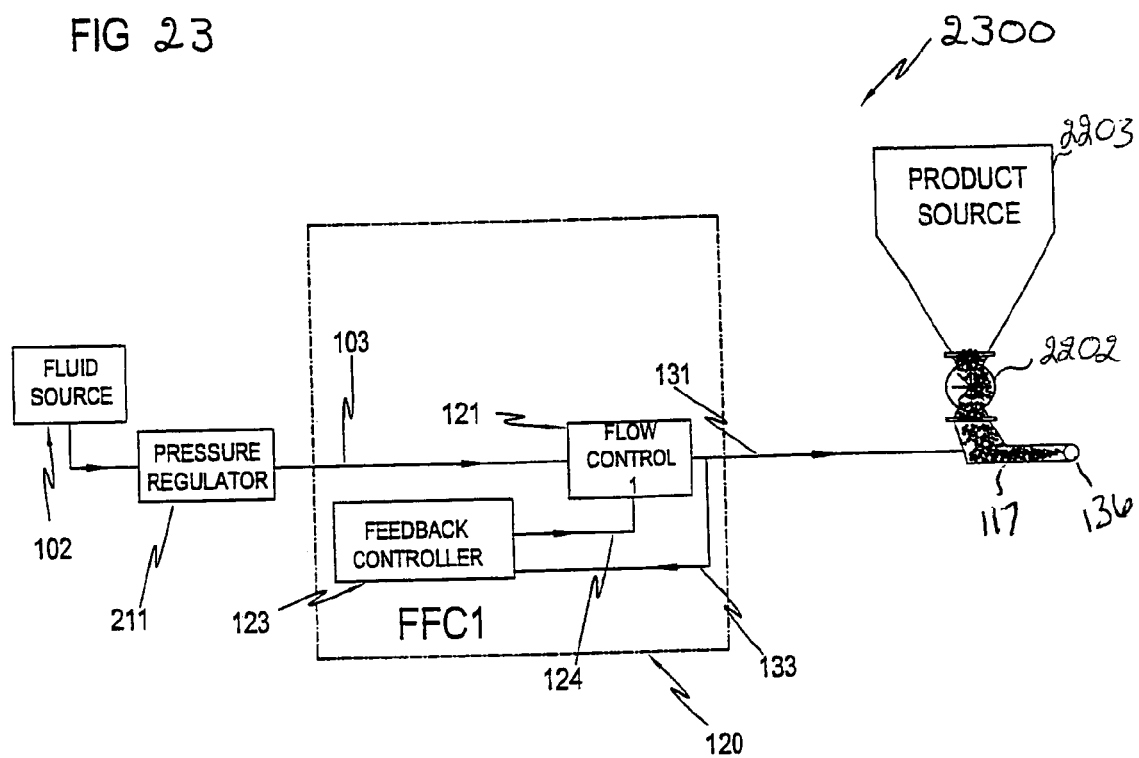

APPARATUS AND METHOD FOR CONTROLLING FLUID FLOWS FOR PNEUMATIC CONVEYING

FIELD OF THE INVENTION

This invention relates to the field of pneumatic conveyors, and more specifically to a method and apparatus for controlling gas flow rates among a plurality of pneumatic lines and enhancing performance, reliability and availability in conveying systems for dry materials.

BACKGROUND OF THE INVENTION

Hoppers are often used to hold bulk quantities of materials such as grain, flour, sugar, or plastic beads. Hoppers can be built and used in stationary environments, such as flour elevators, or in mobile environments, such as railroad cars, cargo ships, or semi-trailer trucks. A pressurized fluid, (as used herein, a fluid can be, e.g., a gas such as compressed air, or a liquid such as water), can be used to convey such materials from a hopper to another place for storage or use. For example, a pressurized gas applied at the lower exit port of a tapered hopper can force the material coming out of the hopper into and through a pipe. It is often advantageous to apply some gas pressure to the top of the material; i.e., to seal the top and pressurize the hopper or similar container in order to urge the material out the tapered bottom of the hopper. In this art, a hopper, or similar container for holding materials such as dry particulates (e.g., flour, grain, granulated sugar, plastic pellets, etc.), that can be pressurized is sometimes called a pressure pot or a blow tank.

U.S. patent Application US 2003/0206776 A1, titled "RAILROAD HOPPER CAR UNLOADER" by William Pearson, published Nov. 6, 2003, describes a system that unloads material, such as bulk quantities of dry product, from a container, such as a railroad hopper car. The container defines an enclosed interior that holds a product and includes a product-discharge section adapted to allow the product to exit therethrough. In some conventional systems, the unloading of the railroad-hopper car occurs solely under the influence of gravity. To accomplish this, a valve provided on the bottom of the tapered discharge section of the container is opened, allowing the product to flow downwardly therethrough into a receiving apparatus. Such gravity unloading is simple and inexpensive from an equipment standpoint, but has been found to be rather inefficient. This is because the product unloads from the container at a relatively slow rate, which undesirably increases the amount of time and resources required to empty the product from the container. Also, portions of the product often coalesce and adhere to the interior of the container. When this occurs, portions of the product do not unload under the sole influence of gravity, thus requiring additional time and effort to dislodge such portions for unloading. To address these problems, some conventional railroad-hopper cars are provided with equipment that introduces pressurized fluid (called the pressurization or upper-end flow, which may be air, in some embodiments) within the container during the unloading process, which helps push the product out of the container at a rate that is faster than if the product was unloaded solely under the influence of gravity. Additionally, the flow of pressurized air within the container tends to stir up or fluidize the product therein so as to minimize the occurrence of coalescence and adherence of the product to the interior of the container. Some conventional material-unloading systems also include a product-outlet line adapted to receive material from the product-discharge section of a hopper, and to also receive pressurized fluid (called the conveying or lower-end flow, which also may be air, in some embodiments) that is used to move product from the product discharge section though the product-outlet line.

When pressure and air flow are applied to the top of the material (the upper-end flow) as well as to the exit pipe (the lower-end flow) of a pressure pot, there is an adjustment that should be made to achieve the proper amount of pressure and flow applied to the upper- and lower-end of the material to achieve the fastest material flow. If too much pressure is applied to the upper end, too much material is pushed out of the pressure pot in a given amount of time, which clogs the exit pipe and stops the material flow. If too much pressure is applied to the lower end, then more carrier fluid (e.g., air) and less material flows out the exit pipe.

Thus, there is a need for improved methods and mechanisms to automatically adjust the balance of flow and pressure between the upper end and lower end of a pressure pot.

SUMMARY OF THE INVENTION

Some embodiments of the invention provide a system and method that provide an automatic adjustment of one or more of the flows of carrier fluid used to empty dry material from a pressure pot or enclosed hopper. In some embodiments, as pressure increases in the conveying line that receives the dry material, the rate or proportion of flow to the conveying line is increased and/or the rate or proportion of flow to the pressurization line, which assists pushing the material out of the pressure pot, is decreased. In some embodiments, adjustable critical-flow venturies (CFVs) are used to control the flow(s) of fluid, and a pneumatic cylinder is used to move pintles in and out of the CFVs to control the rates of flow. In other embodiments, the flow of dry material out of the hopper into the conveying line is mechanically controlled, for example by a rotary valve whose speed is automatically slowed based on a detected increased air pressure in the conveying line (which indicates that material flow is being impeded by too much material in the conveying line).

Some embodiments of the invention include a fluid-flow controller (FFC) that can generally be used to help empty dry particulate material from a variety of hoppers, or more particularly a pressure-pot-fluid-flow controller (PPFFC) apparatus for emptying a pressure pot having a conveying line connected to receive material removed from the pressure pot and a pressurization line connected to pressurize the pressure pot. The apparatus includes a first flow controller having an output that supplies fluid to the conveying line, a second flow controller having an output that supplies fluid to the pressurization line, and a controller operably coupled to the first flow controller and to the second flow controller. The controller, based on an increase in pressure in the conveying line, controls the second flow controller to cause a decrease in mass flow (e.g., kilograms per minute) or volume flow (e.g., liters per minute) of fluid into the pressurization line.

Other embodiments include a method for controlling emptying of a pressure pot, the pressure pot having a conveying line connected to receive material removed from the pressure pot and a pressurization line connected to pressurize the pressure pot. In some embodiments, this method includes supplying fluid at a first mass-flow rate to the conveying line, supplying fluid at a second mass-flow rate to the pressurization line, and based on an increase in pressure in the conveying line, automatically decreasing the mass-flow rate of fluid into the pressurization line.

Yet other embodiments include a system including a first critical-flow venturi (CFV), a second critical-flow venturi, and a pneumatic cylinder operatively coupled to the second CFV to decrease an opening area of the second CFV based on an increase in pressure at an output of the first CFV.

Still other embodiments include a system including a first critical-flow venturi (CFV), a second critical-flow venturi, and means for decreasing mass flow through the second CFV based on an increase in pressure at an output of the first CFV.

Additional embodiments include a fluid-flow controller (FFC) apparatus for emptying a pressure pot, the pressure pot having a conveying line connected to receive material removed from the pressure pot and a pressurization line connected to pressurize the pressure pot. In some embodiments, the apparatus includes a first flow controller having an output that supplies fluid to the conveying line, a second flow controller having an output that supplies fluid to the pressurization line, and a controller operably coupled to the first flow controller and to the second flow controller, wherein the controller, based on an increase in pressure in the conveying line, controls the first flow controller to cause an increase in mass flow of fluid into the pressurization line.

Further embodiments include a method for controlling emptying of a pressure pot, the pressure pot having a conveying line connected to receive material removed from the pressure pot and a pressurization line connected to pressurize the pressure pot. This includes supplying fluid at a first mass-flow rate to the conveying line, supplying fluid at a second mass-flow rate to the pressurization line, and based on an increase in pressure in the conveying line, automatically increasing the mass-flow rate of fluid into the conveying line.

BRIEF DESCRIPTION OF THE DRAWINGS

FIG. 4A is a block diagram of FFC2 system 400 according to some embodiments of the invention.

FIG. 4B is a block diagram of FFC1 system 475 of some embodiments.

FIG. 4C is a block diagram of FFC1 system 480 of some embodiments of the invention.

FIG. 5 shows a schematic cross-section view of a typical critical-flow venturi 500.

FIG. 6 shows a schematic cross-section view of a compensated critical-flow venturi 600 that can be used as an adjustable-flow CFV (critical-flow venturi).

FIG. 7 is a block diagram of FFC system 700 according to some embodiments of the invention.

FIG. 8A is a cutaway perspective view of a split-CFV FFC system 800 according to some embodiments of the invention.

FIG. 8B is a plan cross-section view of split-CFV system 800.

FIG. 8C is a front cross-section view of split-CFV system 800.

FIG. 8D is a front cross-section view of block 810 of split-CFV system 800.

FIG. 8E is a side cross-section view of block 810.

FIG. 8F is a side view of block 810.

FIG. 8G is a front cross-section view of movable divider 811 of system 800.

FIG. 8H is a side cross-section view of movable divider 811.

FIG. 8I is a side view of movable divider 811.

FIG. 9 is a block diagram of a fluid-flow controller (FFC) system 900 according to some embodiments of the invention.

FIG. 11A is a block diagram of a discretely adjustable fluid-flow controller (FFC) system 1100 according to some embodiments of the invention.

FIG. 11B is a graph of conveying flow and pressurization flow versus piston position for the system of FIG. 11A.

FIG. 23 is a block diagram of a fluid-flow-control system 2300 according to some embodiments of the invention.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally correspond to the Figure number in which that component is first introduced, such that the same reference number is used throughout to refer to an identical component which appears in multiple Figures. Signals (such as, for example, fluid pressures, fluid flows, or electrical signals that represent such pressures or flows), pipes, tubing or conduits that carry the fluids, wires or other conductors that carry the electrical signals, and connections may be referred to by the same reference number or label, and the actual meaning will be clear from its use in the context of the description.

System Environment

Figure 1:
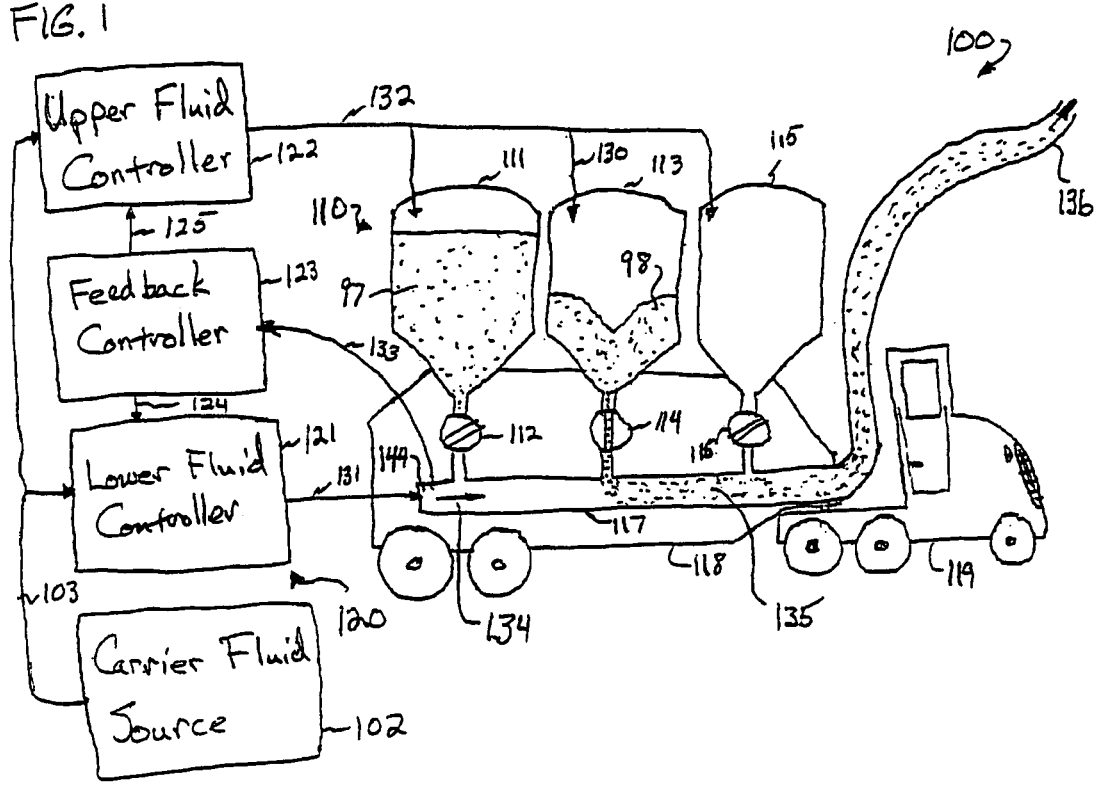
FIG. 1 is a block diagram of a hopper-emptying fluid-flow-control system 100 of some embodiments of the invention.

FIG. 1 is a block diagram of a system 100 of some embodiments of the invention. System 100 includes a container 110 having one or more pressure pots 111, 113, and/or 115 for holding bulk quantities of one or more products or materials 97 and/or 98. In some embodiments, container 110 is mounted to a transportation system such as a semi-tractor 119 and trailer 118 as shown, or a railroad car or ocean-going barge. In other embodiments, pressure-pot container 110 is part of a fixed facility such as a grain or flour elevator. Fluid-flow controller (FFC) 120 is used to control the flows of carrier fluid used to assist emptying container 110. In some embodiments, materials 97 and 98 are the same material (e.g., dry material such as flour, sugar, grain, or plastic pellets), while in other embodiments, different materials 97 and 98, or different qualities of the same material can be held in the various pressure pots 111, 113, and/or 115.

In some embodiments, optional discharge valve 112 (shown in the closed position) is provided at the lower end of pressure pot 111, optional discharge valve 114 (shown in the open position) is provided at the lower end of pressure pot 113, and optional discharge valve 116 (shown in the closed position) is provided at the lower end of pressure pot 115. The upper-end or pressurization flow 130 of carrier fluid into pressure pot 113 will urge material 98 out of pressure pot 113 through open valve 114 and into product-outlet line 117 (e.g., a pipe, tube, or hose), where it is further stirred up and fluidized by pressurized conveying fluid 134 into a material flow 135 towards exit port 136.

In some embodiments, pressurization line 132 (or, in some embodiments, an additional line, not shown, for introducing pressurized carrier fluid) is introduced into pressure pot 113 and the other pressure pots near the bottom of each of the pressure pots, such that when pressurized air is injected there, it acts to lift the material 98 in order to loosen and fluidize the particles of material 98 that tend to settle and pack during transportation and over time.

At the moment of time shown, pressure-pot exit valve 114 is open and valves 112 and 116 are closed, and thus, pressure pot 113 is being emptied. At other times during the unloading process, other valves are opened to unload the other pressure pots. In some embodiments, for example, at an earlier time, valve 114 would have been closed and valve 116 opened in order to empty pressure pot 115. At a later time, valves 114 and 116 would have been closed and valve 112 opened in order to empty pressure pot 111. In other embodiments, more than one pressure-pot exit valve could be opened at the same time.

Conveying line 131 is a conduit for a conveying fluid (also called a carrier fluid or a lower-line fluid), which may, in various embodiments, be a gas such as air or a liquid such as water, and is used to carry material 98, once it enters line 117, toward output port 136. Pressurization line 132 is a conduit for a pressurization fluid (also called an upper-line fluid), which also may, in various embodiments, be a gas such as air or a liquid such as water, and is used to pressurize, thus urging more material 98 out of, pressure pot 110 so it enters line 117, toward exit port 136. In some embodiments, the pressurization fluid from line 132 also flows through material 98 in section 113 of pressure pot 110 toward and through exit valve 114, thus adding to the carrier fluid from line 131 in carrying the material 98 toward output port 136.

Figure 2:
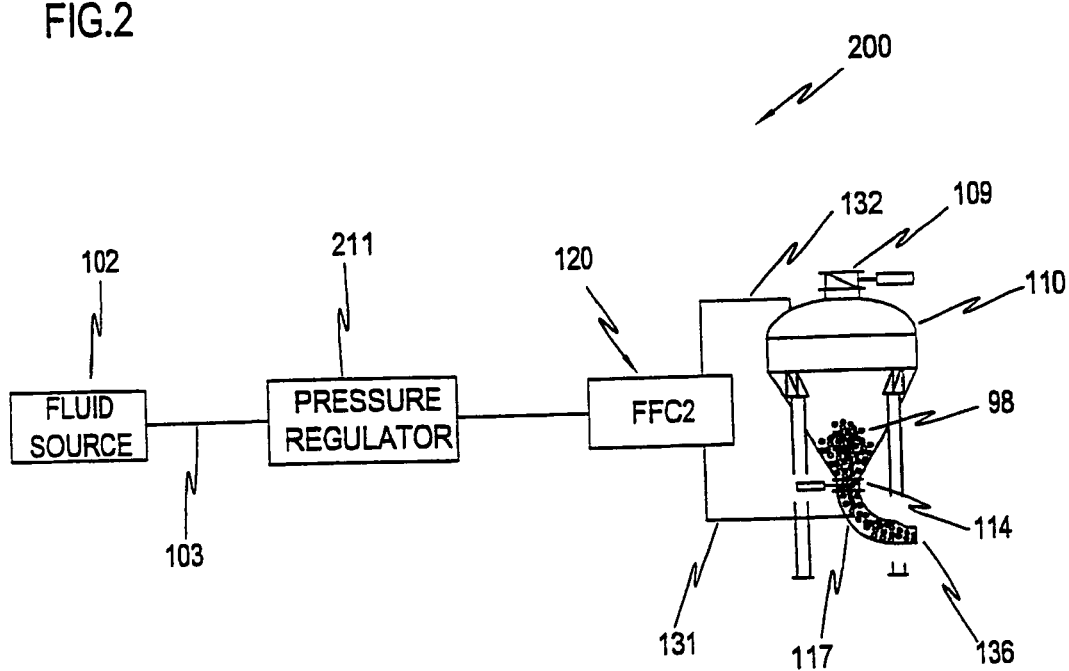
FIG. 2 is a block diagram of a system 200 of some embodiments of the invention.
Figure 15:
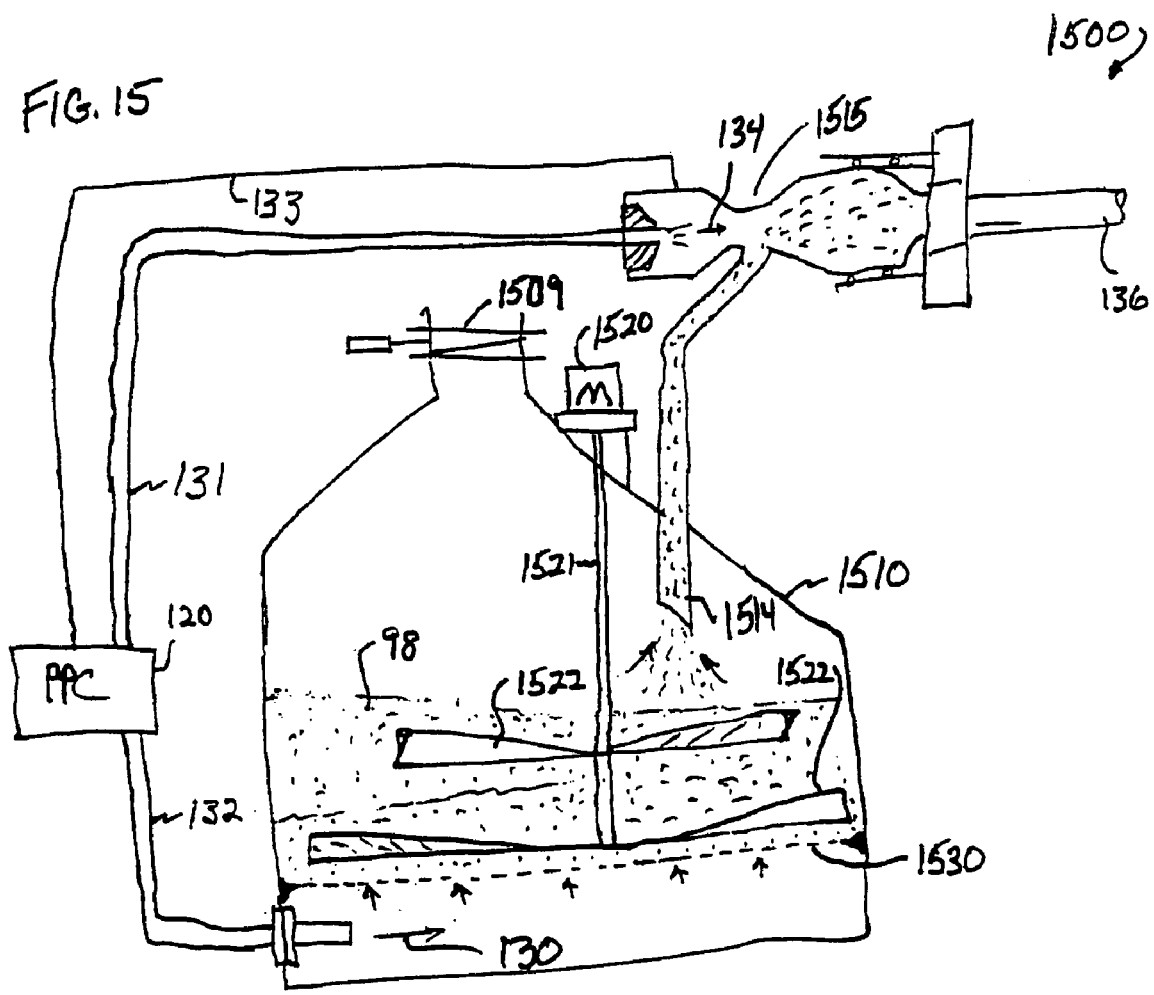
FIG. 15 is a block diagram of a fluid-flow-control system 1500 of some embodiments of the invention.

Note that the terms "upper" for the pressurization line and "lower" for the conveying line apply to embodiments such as shown in FIG. 1 and FIG. 2 where the material 98 is removed from the lower portion of pressure pot 110. Other embodiments, such as shown in FIG. 15 and described below, apply the pressurization line to the lower portion of the pressure pot and remove material with a conveying line at the upper portion of the pressure pot.

Carrier-fluid controller 120 (also called FFC controller 120), in some embodiments, includes lower-fluid (or conveying-line) controller 121 that provides and controls the flow rate of lower-end pressurized fluid in conveying line 131 (e.g., a pipe or tube), upper-fluid (or pressurization-line) controller 122 that provides and controls the flow rate of upper-end pressurized fluid in pressurization line 132 (e.g., also a pipe or tube), and feedback controller 123 which receives feedback signal 133, and provides control 124 to lower-fluid controller 121, and control 125 to upper-fluid controller 122. In some embodiments, a carrier-fluid source 102 supplies a carrier fluid 103 (such as pressurized air) to lower-fluid controller 121 and to upper-fluid controller 122.

If too much material 98 is pushed from pressure pot 113 into line 117 in a short period of time, the fluidized flow 135 will have too much material for the amount (mass flow) and speed of carrier fluid 134, causing the material to undesirably slow down and possibly clog line 117 and/or output pipe 136. This will cause the pressure of carrier fluid 134 to increase. Signal 133 conveys this pressure information to feedback controller 123, which then provides control 125 to cause upper-fluid controller 122 to decrease the amount of upper-end flow in pressurization line 131 (which decreases the flow of material 98 pushed out of pressure pot 113 through valve 114 into line 117). Feedback controller 123 also provides control 124 to cause lower-fluid controller 121 to increase the amount of lower-end flow 134 (which increases the fluidization and flow of material 135 pushed out of line 117). Note that as the pressure of carrier fluid 134 increases, carrier-fluid controller 120 further increases the flow of fluid 134 which will further increase the pressure. This increased flow and pressure of fluid 134 will thus flush the too-dense material 135 from line 117, thus reducing the pressure, and signal 133 to feedback controller will cause an increase of flow in pressurization line 132 to again urge more material 98 through valve 114.

In some embodiments, carrier-fluid source 102 is a positive-displacement or other suitable air blower, pump, compressor, or some other gas or liquid source. In some embodiments, carrier-fluid source 102 is a positive-displacement blower that can supply the carrier fluid 103 (e.g., air at about 15 to 18 psi, which is about 1.0 to 1.25 kilogram-force per square centimeter (kgf/cm$^2$)), at some optimum efficiency if the flow of carrier fluid 103 is supplied at some constant flow rate (e.g., in some embodiments, about 600 cubic feet per minute (cfm), which is about 16990 liters per minute). If, suppose, such an air blower 102 were delivering 600 cfm at 15 psi into source line 103, and demand were suddenly cut to 550 cfm, the pressure might build up and trigger a pressure-relief valve to open, thus stopping operation of the hopper-emptying system 100.

Accordingly, in some embodiments, it is desirable that for each increase or decrease in the lower-end flow in conveying line 131, there is a substantially equal decrease or increase, respectively, in the upper-end flow in pressurization line 132 such that the sum of lower-end flow in conveying line 131 and upper-end flow in pressurization line 132 is some given or predetermined constant flow rate. Thus, in some embodiments, fluid-flow controller 120 draws air from source line 103 at a substantially constant flow rate, and delivers a first subportion of the total flow rate to line 131 and a second subportion of the total flow rate to line 132, such that the sum of the first subportion and the second subportion equal a constant (usually substantially all of the total flow rate from line 103, with very small portions of the total flow rate used for other purposes such as generation of a reference pressure for cylinder 123). In some such embodiments, the amount of the first subportion is adjustable (e.g., increased pressure causes an increase in the flow rate to line 131), and the amount of the second subportion also adjusts in a complementary way (e.g., increased pressure causes a decrease in the flow rate to line 132 that is equal in magnitude to the increase to line 131), such that the total of the first subportion and the second subportion is a constant. In some such embodiments, the pintles in CFV flow regulators 121 and 122 are tapered with a taper (e.g., a parabolic taper) such that for a given X movement of both pintles, the increase in cross sectional area of one pintle moving into the throat of its CFV equals the decrease in cross sectional area of the other pintle moving out of the throat of its CFV. Since the total opening cross section of the CFV without the pintle is constant, and the cross section area of the pintle blocking a portion of that throat is proportional to the square of its radius, if the radius of each tapered pintle increases as the square of the distance from the end of the pintle, the increase in cross sectional area of one pintle moving into the throat of its CFV equals the decrease in cross sectional area of the other pintle moving out of the throat of its CFV.

In other embodiments, both flows are adjustable (i.e., increased pressure causes an increase in the flow rate to line 131, and a decrease in the flow rate to line 132, in order to reduce the amount of material flowing out of the pressure pot and increase the amount of carrier fluid, and thus clear the blockage in the output line) but the changes are not necessarily always equal in magnitude, such that the total flow rate is not constant. For example, in a plant situation, an air compressor may be used that can accommodate changes in flow, so that less expensive flow regulators 121 and 122 having straight conically tapered pintles can be used.

In yet other embodiments (e.g., embodiments where the carrier-fluid source 102 can accommodate changes in flow rates used), automatic regulation of either the flow to the pressurization line 132 or to the conveying line 131 is provided (i.e., increased pressure in the conveying line 131 causes an increase in the flow rate to line 131, or a decrease in the flow rate to line 132), while flow to the other line is not changed as a result of the pressure change. In some embodiments, the total flow is still kept constant. For example, in some embodiments, an adjustable diverter valve is placed in the pressurization line 132, such that increased pressure in the conveying line 131 causes a decrease in the flow rate to line 132, reducing the flow of material out of the pressure pot, while the flow rate in the conveying line 131 is not controlled (e.g., to save cost). In some such embodiments, the total flow rate of line 103 is still kept constant (e.g., by using fixed CFVs for both 121 and 122), but some of the flow in pressurization line 131 is vented to reduce material flow out of pressure pot 110. In other embodiments, increased pressure in the conveying line 131 causes an increase in the flow rate to line 131 to help push material out of the output line, while the flow rate in the pressurization line 132 is not controlled (e.g., to save cost).

In some embodiments, FFC 120 includes upper-flow fluid controller 121, feedback controller 123 and lower-flow fluid controller 121, wherein feedback controller 123 includes a microprocessor, programmable logic controller (PLC), or other electronic controller to control signal 125 (e.g., a first linear servo that controls the motion of a pintle to control the conveying flow through a CFV of unit 121) and signal 124 (e.g., a second linear servo that controls the motion of a pintle to control the pressurization flow through a CFV of unit 122). In some embodiments, feedback controller 123 uses a lookup table or other suitable mechanism, calibrated such that the conveying flow through a CFV of unit 121 plus the pressurization flow through a CFV of unit 122 result in a total flow that is substantially constant. Further, such a lookup table is able to implement any number of different pressure-flow transfer curves (i.e., the curve of change in flow as a function of pressure).

In other embodiments, lower-fluid controller 121 includes a CFV that is not adjusted by feedback controller 123 (in some embodiments, the flow of unit 121 is manually adjustable, but then remains fixed), and upper-fluid controller 122 includes a CFV that is not adjusted by feedback controller 123 (in some embodiments, the flow of unit 122 is manually adjustable, but then remains fixed), but which is followed by an adjustable diverter or dump valve that releases pressure in line 132 in proportion to an increase in pressure in conveying line 131. This system allows the total flow in line 103 to remain constant (i.e., equal to the sum of the fixed flows through the CFVs in units 121 and 122), but the pressure in pressurization line 132 decreases or is totally released to slow or stop outflow of material 98 if the pressure increases in conveying line 131.

Control of Pressure Pot for Pneumatic Conveying

FIG. 2 shows a schematic representation of a control system 200 and its controls, which is used in some embodiments for pneumatic conveying of materials 98 (e.g., particulates, granulates, pulverulence, ash, soot, flakes, chips, fines, meal, dust, dross, rubble, gratings, grit, grounds, precipitate, silt, pulp, slurry, dry powders, pellets, slugs, granular materials, etc.) from a pressure pot (also called a blow tank or enclosed hopper). The control provided by fluid-flow controller 120 is fully self-regulating and requires no additional outside devices. FIG. 2 shows a single pressure pot; however, the system could be used for multiple pressure pots discharging into a common line (for example, a pressure-differential (PD) truck-unloading system such as shown in FIG. 1, or PD railcar). In some embodiments, system 200 includes two variable-area (i.e., dynamically adjustable) critical-flow-venturi flow regulators (described further below, these are also called critical-flow-venturies (CFVs), sonic chokes, or Laval valves; exemplary Fox-brand devices as generally described in the below) whose individual flow rates are controlled mechanically by, e.g., pintles operated by a single, linear, pneumatic cylinder. In some embodiments, the two critical-flow venturies are controlled by pintles that act in opposite directions (i.e., as one opens, the other closes, and in some embodiments, as one opens by some amount, the other closes by the same amount), in order to maintain a substantially constant 'open' cross-sectional area (i.e., the open area of the first venturi plus the open area of the second venturi will remain constant as the pintles in the two venturies change position to compensate for changes in conveying-line pressure). Since the flow rates of each of these CFV flow regulators are proportional to the open cross-sectional areas, the constant total open cross-sectional area results in a constant total flow rate of the sum of the upper-end flow and the lower-end flow.

In some embodiments, pressure regulator 211 regulates pressure flow between fluid source 102 and fluid-flow controller 120. In some embodiments of the invention, two-line fluid-flow controller (FFC2) 120 is called a differential-fluid-flow controller (DFFC) or just a fluid-flow controller (FFC), and in other embodiments, FFC2 120 is called a pressure-pot controller (PPC) (wherein one output-fluid line provides pressure and flow within the pressure pot (also sometimes called an enclosed or sealed hopper)).

Figure 3A:
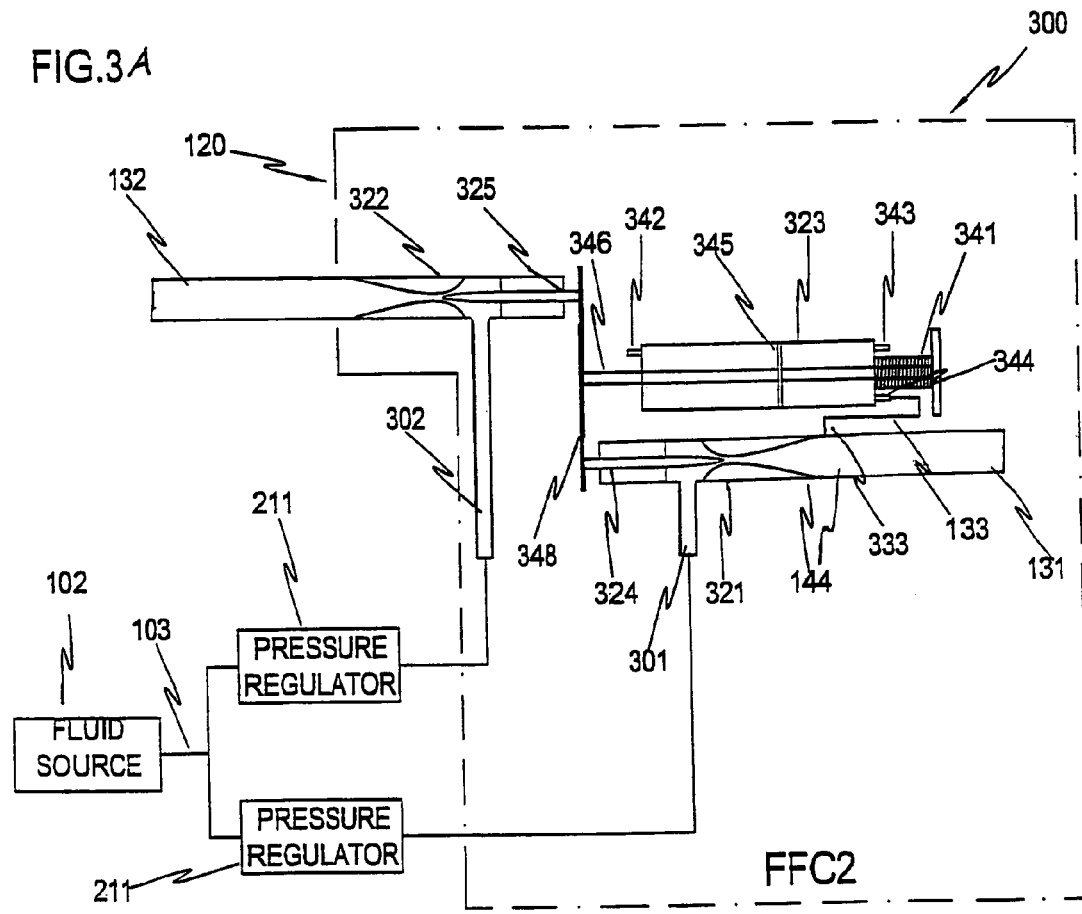
FIG. 3A is a block diagram of a two-line fluid-flow controller (FFC2) system 300 according to some embodiments of the invention.

FIG. 3A is a block diagram of an FFC2 system 300 according to some embodiments. In some embodiments, pneumatic cylinder 323 (which corresponds to and can be used as the feedback controller 123 of FIG. 1) is spring loaded, wherein an increase in air pressure from feedback signal 133 through interconnect line 333 pushes the piston 345 one direction (e.g., leftward in FIG. 3A) and the spring 341 pushes the piston 345 the opposite direction, and wherein the 'K' value of the spring 341 is based on the specific application and geometry of the components (e.g., the area of the face of piston 345). In some embodiments, a suitable K value is empirically derived. In some embodiments, the K constant and/or the default position of the spring is manually adjustable, for example, by a screw. In some embodiments, the K value varies as a function of the position, in order to vary the amount of flow change at different feedback pressures at the interconnect line 333. Feedback line 333 (which provides a conduit for feedback signal 133) connects and conducts air from the clean-air portion 144 of the conveying line air 131 (the carrier fluid) to the pneumatic cylinder 323. Line 301 provides pressurized fluid to CFV 321 from header 103, and line 302 provides pressurized fluid to CFV 322 from header 103.

In some embodiments, one or more vent/inlet ports 342 and 343 are provided in cylinder 323 to moderate the speed of response of piston 345 by allowing air to slowly leak in or out of the cylinder, in order to dampen oscillations or pulsing between a condition of too much conveying flow and too little. In some embodiments, rod 346 and plate 348 connect piston 345 to pintle 325 and pintle 324, such that they all move left or right in unison. As the air pressure in the conveying line 333 (connected to port 344 of cylinder 323) increases, piston 345 moves left, spring 341 is compressed and the 'open' area on venturi #1 (CFV 321) increases, with a corresponding decrease in the 'open' area on venturi #2 (CFV 322). This increases the air mass flow in the conveying line 131 and reduces the air mass flow in the pressurization line 132. The result is less material 98 flowing from the pressure pot container 110 into the conveying line 117. A decrease in the pressure in the conveying line results in the opposite effect. The speed at which the pneumatic cylinder 323 adjusts is based on the size of the cylinder and the air flow from the conveying line to the pneumatic cylinder, and can be controlled by setting and/or manually adjusting the size of the two vent/inlets 342 and 343. The 'K' value for the spring is set for a desired conveying pressure. For example, in a PD-truck-unloading application, the 'K' value for the spring might correspond to the equivalent of 10 pounds-per-square-inch gauge (psig) in the conveying line. Ten psig is about 0.703 kilogram-force per square centimeter (kgf/cm2). If the conveying line pressure is less than 10 psig, the system would respond by providing additional pressurization air to increase the flow of material into the conveying line. If the conveying line pressure was above 10 psig, then the pressurization air flow would be decreased to reduce the flow rate of material into the conveying line.

Figure 3B:
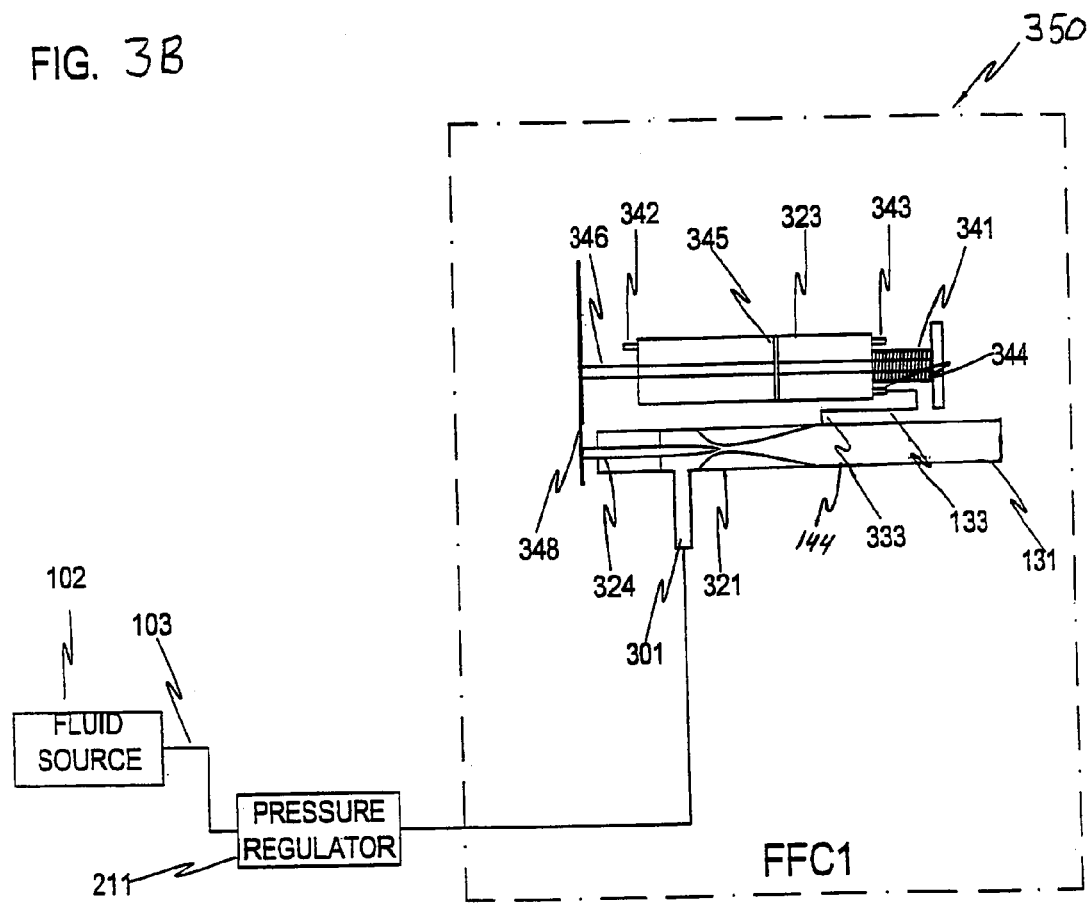
FIG. 3B is a block diagram of a one-line fluid-flow controller (FFC1) system 350 of some embodiments.

FIG. 3B is a block diagram of a one-line fluid flow controller (FFC1) 350 according to some embodiments of the invention. In some embodiments, pneumatic cylinder 323 is spring loaded and is connected to only one line of the pressure pot system (e.g., conveying line 131 in FIG. 3B). An increase in air pressure from feedback signal 133 through interconnect line 333 will move the piston 345 one direction (e.g., leftward in FIG. 3B) and the spring 341 pushes the piston the opposite direction. The directional change in piston 345 is directly related to movement of pintle 324 (e.g., as piston 345 moves left, pintle 324 moves left and out of venturi 321, allowing an increase of air flow in conveying line 131). In some embodiments, regulation of air flow by FFC1 350 is restricted to one line of the fluid-flow-control system (e.g., conveying line 131 in FIG. 3B) while the alternate line of the fluid-flow-control system (e.g., pressurization line in FIG. 3B) continues at a constant flow rate.

Figure 3C:
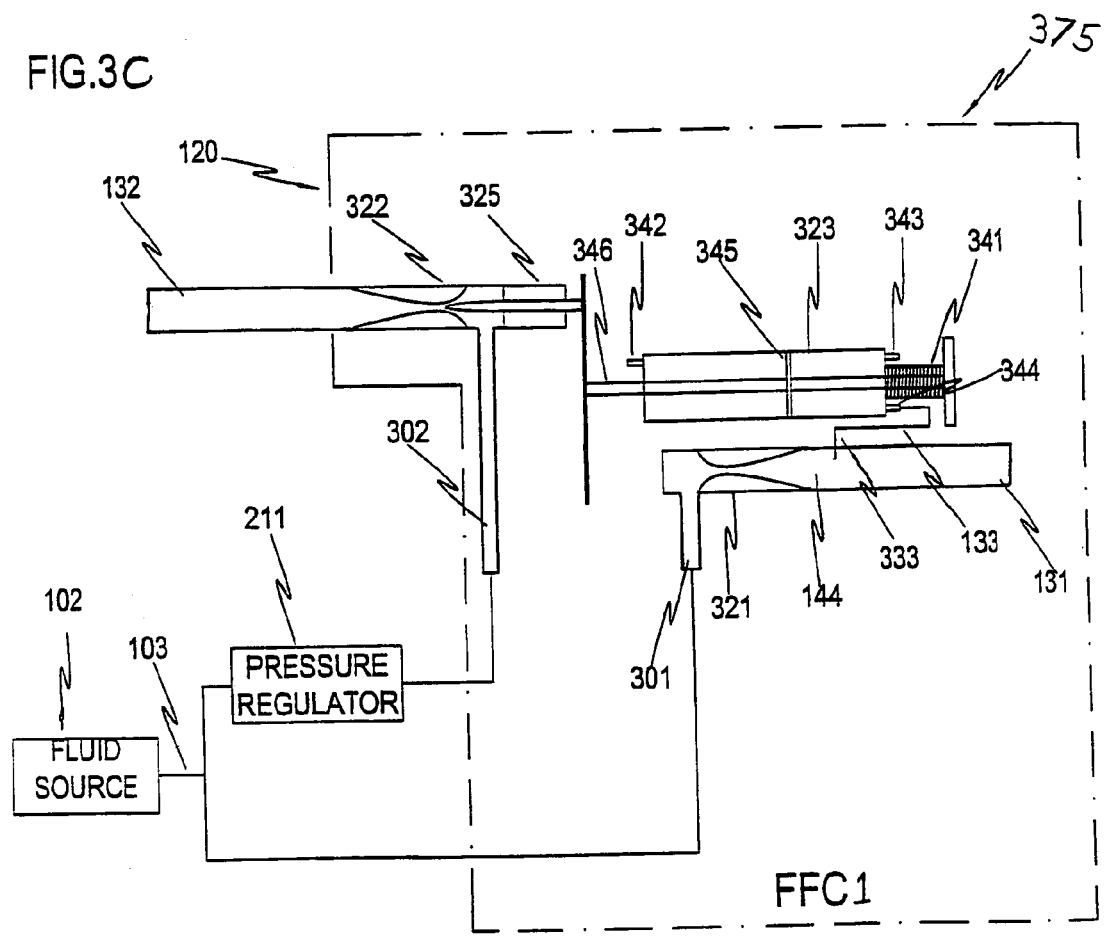
FIG. 3C is a block diagram of a one-line fluid-flow controller (FFC1) system 375 of some embodiments of the invention.

FIG. 3C is a block diagram of an FFC1 system 375 of some embodiments. In some embodiments, regulation of air flow by FFC1 375 is restricted to one line of the fluid-flow-control system (e.g., pressurization line 132 in FIG. 3C) while the alternate line of the fluid-flow-control system (e.g., conveying line 131 in FIG. 3C) continues at a constant flow rate. An increase in pressure from feedback signal 133 through interconnect line 333 will move the piston 345 one direction (e.g., leftward in FIG. 3C) which causes pintle 325 to move in a similar direction (e.g., leftward in FIG. 3C) and further into venturi 322, thereby decreasing air flow in pressurization line 132. A decrease in pressure in conveying line 131 will have the opposite effect and increase air flow in pressurization line 132.

FIG. 4A is a block diagram of an FFC2 system 400 according to some embodiments. In some embodiments, pneumatic cylinder 423 (which corresponds to and can be used as the feedback controller 123 of FIG. 1) responds to the pressure differential between the pressure in line 333 and the regulated pressure supplied by regulator 449 to port 448 (in place of the spring-loaded mechanism 341 of FIG. 3), wherein an increase in air pressure from feedback signal 133 through interconnect line 333 pushes the piston 445 one direction (e.g., leftward in FIG. 4A) and the pressure from regulator 449 pushes the piston 445 the opposite direction. In some embodiments, pressure regulator 449 is manually adjustable, for example, by a screw, such that it is set to match the desired pressure in conveying line 131. In some embodiments, a suitable pressure value is empirically derived. Feedback line 333 (which provides a conduit for feedback signal 133) connects and conducts air from the clean-air portion 144 of the conveying line air 131 (the carrier fluid) to the pneumatic cylinder 423. Line 301 provides pressurized fluid to CFV 321 from header 103, and line 302 provides pressurized fluid to CFV 322 from header 103. Rod 446 connects piston 445 to pintle 325, and rod 447 connects piston 445 to pintle 324, and all of these parts move along a straight line. In some embodiments, port 448 and port 444 include one-way valves that only allow flow into cylinder 423, and vents 442 and 443 allow air to escape at an adjustable controlled rate, in order to control (slow down) the response speed of piston 445. In some embodiments, this helps dampen sudden changes that might otherwise cause oscillations or pulsing.

FIG. 4B is a block diagram of an FFC1 system 475 according to some embodiments of the invention. In some embodiments, pneumatic cylinder 423 responds to a pressure differential between the feedback signal 133 through interconnect line 333 and the pressure from pressure regulator 449 to adjust pressure in one line of the fluid-flow-control system (e.g., conveying line 131 in FIG. 4B). An increase in air pressure from feedback signal through interconnect line 333 pushes piston 445 to one direction (e.g., leftward in FIG. 4B) which moves pintle 324 out of venturi 321, increasing air flow through conveying line 131. In some embodiments, regulation of air flow by FFC1 475 is restricted to one line of the fluid-flow-control system (e.g., conveying line 131 in FIG. 4B) while the alternate line of the fluid-flow-control system (e.g., pressurization line in FIG. 4B) continues at a constant flow rate.

FIG. 4C is a block diagram of an FFC1 system 480 of some embodiments. In some embodiments, pneumatic cylinder 423 adjusts air pressure in one line of the fluid-flow-control system (e.g., pressurization line 132 in FIG. 4C) by responding to a pressure differential between the feedback signal 133 through interconnect line 333 and the pressure from pressure regulator 449. An increase in air pressure in conveying line 131 pushes piston 445 to one direction (e.g., leftward in FIG. 4C) which moves pintle 325 further into venturi 322, decreasing air flow through pressurization line 132. In some embodiments, regulation of air flow by FFC1 480 is restricted to one line of the fluid-flow-control system (e.g., pressurization line 132 in FIG. 4C) while the alternate line of the fluid-flow-control system (e.g., conveying line 131 in FIG. 4C) continues at a constant flow rate.

FIG. 5 shows a schematic cross-section view of a typical critical-flow venturi 500 that can be used as an adjustable-flow CFV such as units 121 and/or 122 of FIG. 1, or units 321 and/or 322 of FIG. 3. FIG. 5 is schematic in nature and does not attempt to represent all shapes, curves, sizes, horizontal-versus-vertical scale, etc., accurately. CFV 500 includes an inlet 510 for receiving a pressurized fluid, a plenum or header 523 connected to a venturi 524, and an output port 525. Pintle 530 can be moved 531 in or out of venturi 524, in order to vary the size of its opening. At sufficient upstream pressures in inlet port 510, a shock wave is formed in venturi 524 that outputs a constant flow whose value is based on the inlet pressure and the cross-sectional area of the opening of venturi 524. Tapered pintle 530 is movable in and out of the opening of venturi 524 of venturi body 520, such that the cross-sectional area of the pintle at point 522 provides a variable reduction of the opening 521, thus allowing the flow rate to output port 525 to be varied. In some embodiments, a seal 540 (such as an O-ring) around the shaft of pintle 530 prevents air from leaking out the back. In some embodiments, as shown in FIG. 5, the taper 526 is a straight conical taper (wherein for at least a portion of the cone 526, the (change in radius) per (distance X along the axis of the pintle) is a constant), and the change in cross section opening 521 is proportional to the square of the distance 521 that pintle 530 is moved.

FIG. 6 shows a schematic cross-section view of a compensated critical-flow venturi 600 that can be used as an adjustable-flow CFV, for example, such as units 121 and/or 122 of FIG. 1, or units 321 and/or 322 of FIG. 3. The taper 626 of pintle 630 is compensated such that, for at least a portion of the cone 626, the (change in cross-sectional area) per (distance X along the axis of the pintle) is a constant. In some embodiments, the cross section of the end of such a pintle, along its length, is a parabola that is blunt at its tip. Other aspects of FIG. 6 are the same as for FIG. 5. Pintle 630 can be moved 631 in or out of its venturi in body 520, in order to vary the size of its opening. Accordingly, in an embodiment such as shown in FIG. 3 or FIG. 4 if both pintles are identically tapered, since the pintle in flow regulator 321 is moved out of its venturi by the same amount that the pintle in flow regulator 322 is moved into its venturi, the amount of flow increase in line 131 will equal the amount of flow decrease in line 132, thus keeping the total flow constant or substantially constant.

In other embodiments, pintles with other tapers or other combinations of tapers are used, such that other response curves are provided. For example, in some embodiments, the taper on two pintles is different. For example, one pintle could have a straight conical taper as shown in FIG. 5 (wherein for at least a portion of the cone 526, the (change in radius) per (distance X along the axis of the pintle) is a constant), and the change in cross section opening 521 is proportional to the square of the distance 521 that pintle 530 is moved, and the other pintle has a taper that is inverse of that of FIG. 6, i.e., the reduction of cross-section area toward the tip is proportional to the square of the distance along its axis. In this way, the sum of the cross-sectional areas of the two pintles is a constant (thus providing constant total flow), but the change in cross-sectional area and the change in flow varies as the square of the movement of the pintles. In other embodiments, other tapers are used to achieve a desired response curve (i.e., the plot of change in flow versus change in position, or change in flow versus change in pressure).

FIG. 7 is a block diagram of FFC system 700 according to some embodiments of the invention. In some embodiments, a variable mechanical linkage 720 is provided between the feedback actuator 723 (e.g., a pneumatic cylinder, bellows, or other pressure-to-position actuator) and the two adjustable CFVs 321 and 322 (e.g., CFVs having pintles with straight conical tapers), in order to achieve a desired response curve (i.e., the plot of change in flow versus change in position, or change in flow versus change in pressure). In some embodiments, variable mechanical linkage 720 includes a wheel 710 that rotates around its axis 711 under the control of connecting rod 744 attached to piston 745 in cylinder 723, which moves according to varying pressure in feedback line 133 from conveying line 131. Cylinder 723 can be any suitable cylinder, for example pneumatic cylinder 323 of FIG. 3A or pneumatic cylinder 423 of FIG. 4A. As the pressure of line 133 increases, piston 745 moves right, rotating wheel 710 counter-clockwise. This causes pintle 324 to be withdrawn from CFV 321 at a rate determined by the curve of slot 724 (increasing the flow of conveying air in line 131), and pintle 325 to be further inserted into CFV 322 at a rate determined by the curve of slot 725. In some embodiments, pintles 325 and 324 have straight tapers, and slots 725 and 724, respectively insert and withdraw them at a rate that is the square or inverse square of the movement provided by rod 744. Thus mechanical linkage 720 provides the compensation for the straight tapers of the pintles, by inserting one at a variable rate that compensates for the cross-sectional area varying at the square of the amount of pintle movement, and withdrawing the other at a complementary rate such that the total flow through the two CFVs remains substantially constant.

FIG. 8A is a perspective cut-away diagram of a split-CFV system 800 according to some embodiments of the invention. In some embodiments, a single CFV forms a two-part CFV having a movable partition that varies the proportion of flow into each output. For example, in some embodiments, split CFV system 800 provides a two-part CFV with an elongated venturi opening, wherein a movable partition 811 (e.g., slidable or bendable) allows the opening-cross-sectional area of venturi 822 to be decreased at the same rate as the opening-cross-sectional area of venturi 821 is increased, such that the total cross-sectional area remains constant, and thus the total flow remains constant, since each increase of flow in portion 821 equals the amount of decrease of flow in portion 822. Source line 812 introduces carrier fluid into plenum 813, where it divides according to the movable position of partition 811, some going into CFV 822 and the rest going into CFV 821. The outside portion of CFV 822 and the outside portion of CFV 821 are formed by block 810, while the inside portion of CFV 822 and the inside portion of CFV 821 are formed by movable partition 811, wherein one or both CFVs 822 and 821 have elongated apertures depending on the position of movable divider 811, but are otherwise the same as the other CFVs described herein. Cylinder 123 is actuated based on pressure as described in FIG. 1, and moves divider 811 to vary the openings of CFVs 822 and 821, to vary the proportion of flow to conveying-line output port 831 and pressurization line output port 832.

FIG. 8B is a plan cross-section view of split-CFV system 800 along cutline 8B of FIG. 8A (this is also along cutline 8B of FIG. 8C). The back end 814 of movable partition 811 slides along, and seals against, back wall 815 of block 810, completing the division of flow between output port 832 that feeds pressurization line 132 (not shown in FIG. 8), and output port 831 that feeds conveying line 131 (also not shown in FIG. 8).

FIG. 8C is a front cross-section view of split-CFV system 800 along cutline 8C of FIG. 8B. As divider 811 moves rightward, the opening area of CFV 821 decreases and the opening area of CFV 822 increases.

FIG. 8D is a front cross-section view of block 810 of split-CFV system 800 along cutline 8D of FIG. 8B. In some embodiments, block 810 and/or divider 811 (see FIG. 8A, 8B, or 8C) are assembled from a plurality of pieces.

FIG. 8E is a side cross-section view of block 810 along cutline 8E of FIG. 8D. Curved slots 816 and 817 of block 810 conform to inside curved faces 818 and 819 (see FIG. 8H), respectively, of divider 811.

FIG. 8F is a side view of block 810, showing the position of output port 831, according to some embodiments.

FIG. 8G is a front view of movable divider 811 of split-CFV system 800.

FIG. 8H is a side cross-section view of movable divider 811 along cutline 8H of FIG. 8G. Inside faces 818 and 819 conform to and slide along curved slots 816 and 817 (see FIG. 8E), respectively, as divider 811 moves to vary the opening size of CFVs 821 and 822 (see FIG. 8A).

FIG. 8I is a side view of movable divider 811.

FIG. 9 is a block diagram of a fluid-flow controller (FFC) system 900, according to some embodiments of the invention, which operates much the same as FFC system 400 of FIG. 4A, except that pivot mechanism 920 is used to obtain the complementary motions of pintles 924 and 925. Pivot mechanism 920 includes arm 910 that rotates around axis 911 as pushed or pulled by cylinder 123. In some embodiments, an adjustment screw 912 is provided to move the entire adjustment mechanism 920 by its pivot axis 911 left-ward or right-ward to adjust the total flow. Thus, screw 912 adjusts the total flow of fluid (moving pivot axis left withdraws both pintles and increases total flow), while cylinder 923 adjusts the proportion of pressurization flow to conveying flow (moving of piston 945 leftward decreases pressurization flow and increases conveying flow). Pressure regulator 926 is used to set the desired pressure of conveying line 131. That is, if the pressure in conveying line 131 is higher than that provided by regulator 926, then air travels through line 133 into the left chamber of cylinder 923 (acting as the feedback controller/actuator 123 of FIG. 1), pushing the piston 945 left, which withdraws pintle 924 from CFV 121, thus increasing the conveying air flow through CFV 121, and pushes pintle 925 into CFV 122, thus decreasing the pressurization flow of air through CFV 122 and pressurization line 132, resulting in less material flowing out of the hopper. As the pressure then drops in conveying line 131, the pressure from regulator 926 against face 971 of piston 945 will exceed the pressure in line 133 pressing on face 970 of piston 945, moving the piston 945 to the right (towards closing of CFV 121 and opening of CFV 122) until the two pressures are equal. In some embodiments, regulator 926 and line 133 include one-way valves (not shown) and vent regulators 927 and 928 have venting rates that are manually adjustable using screw pintles 929 and 930, respectively, thus allowing the response speed of the piston 945 to be varied, in order that the system does not pulse or oscillate as the pressure in line 131 changes or is adjusted or regulated. In some embodiments, piston stops 941 and/or 942 are used to limit the travel of piston 945. In some embodiments, additional linkages 981, 982, and 983 are provided between the pivot mechanism 920 and the pintles 925 and 924, and rod 971, in order that those parts can travel along their individual straight lines. The other parts and their operation are as described above.

The following FIGS. 10–14 show discretely adjustable FFCs, wherein a first piston (piston 445 in cylinder 423 (not shown in FIGS. 10–14)) moves a second piston that opens one fixed CFV at a time (e.g., supplying fluid to the conveying line), while simultaneously closing one corresponding fixed CFV at a time (e.g., supplying an equal amount of fluid to the pressurization line). In some embodiments, the size (i.e., the amount of flow allowed) of the CFV on one side, and the amount of increase in flow to the side where that CFV opened, is the same as the size and the amount of decrease in flow to the opposite side where the corresponding complementary CFV closed. In some embodiments, each of the plurality of openable/closable CFVs on the conveying-line side is equal in size to all of the others, and each has a corresponding equal-sized closable/openable CFV on the pressurization-line side. In other embodiments, there are a plurality of different sizes of openable/closable CFVs on the conveying-line side, and each has a corresponding closable/openable CFV on the pressurization-line side, each being the same size as its mate on the conveying-line side.

Figure 10A:
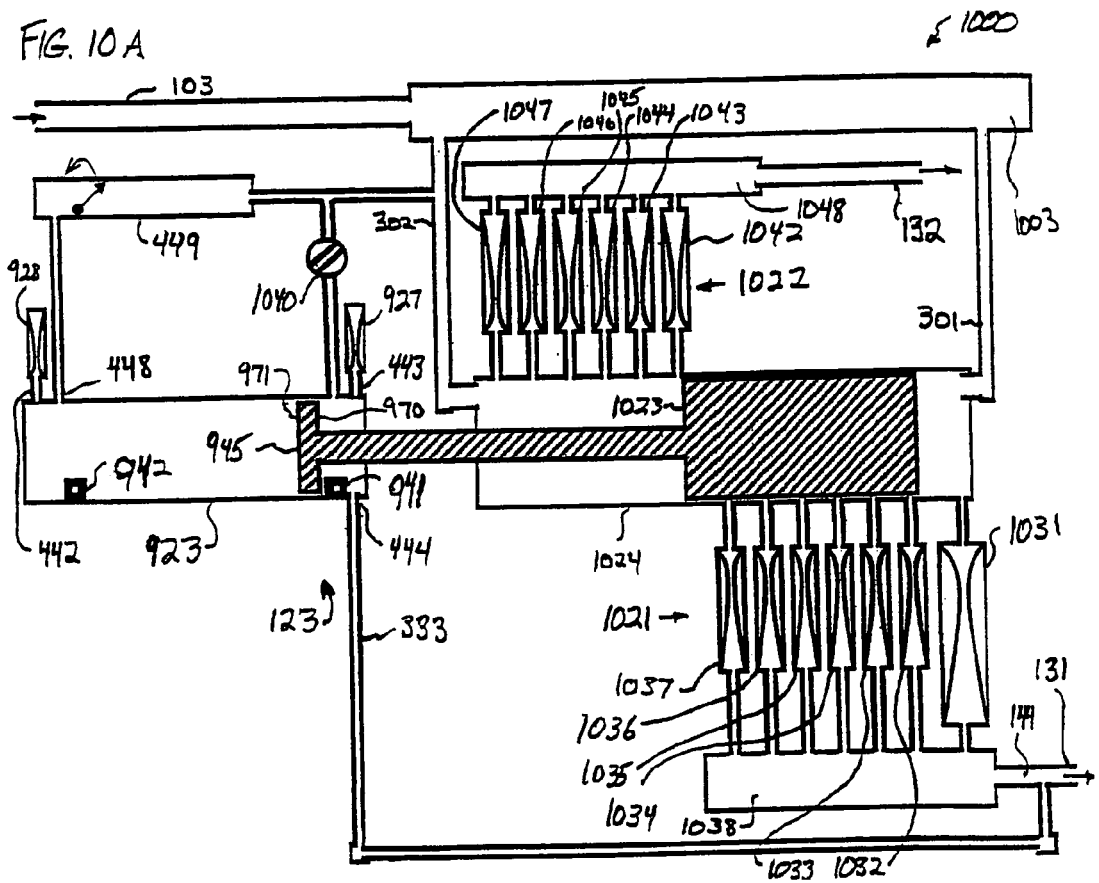
FIG. 10A is a block diagram of a discretely adjustable fluid-flow controller (FFC) system 1000 according to some embodiments of the invention.

FIG. 10A is a block diagram of a discretely adjustable fluid-flow controller (FFC) system 1000 according to some embodiments of the invention. In some embodiments, FFC 1000 includes, as feedback controller 123, a cylinder 923 as described in FIG. 9. In some embodiments, an additional line and manual valve 1040 are included in this and/or other embodiments of the invention, such that unregulated or high-pressure air can be directly vented into cylinder 923 against face 970, in order to override the automatic control and push piston 945 to the left and thus maximize the amount of conveying air and minimize the amount of pressurization air at some point in time (e.g., this may be used at startup in order to get the conveying air moving before any material 98 is introduced into the output line, or at other times such as if the human operator anticipates that a clog or blockage is about to occur, that person can slow or shut down material flow before the automatic system could sense any increase in pressure). In some embodiments, conveying-line regulator 1021 includes a plurality of fixed and/or manually adjustable CFVs, each of which obtains its source fluid from the left end of cylinder 1024 but only if piston 1023 is to the left of the respective CFV's input port (they are "open" or "turned on" if piston 1023 is to the left of their input port, and "closed" or "turned off" otherwise). Thus, the flow of conveying fluid can be increased or decreased in discrete amounts. Piston 1023 seals sufficiently to cylinder 1024 such that if the piston covers the input port of a CFV, no flow goes to that CFV, but if that input port is not covered, as much fluid will flow as allowed by that CFV. In some embodiments, the input port(s) of one or more CFVs 1031 are located far enough to the right on cylinder 1024 (or directly connected to receive input fluid directly from input manifold 1003) such that they are never turned off. That is, some fixed minimum amount (e.g., about 20%, 30%, 40%, 50%, or 60%) of the total fluid is always "on" and supplied through CFV 1031. Pressurization-line regulator 1022 includes a plurality of fixed and/or manually adjustable CFVs, each of which obtains its source fluid from the right end of cylinder 1024 only if piston 1023 is to the right of its input port. In some embodiments, each CFV of conveying-line regulator 1021 has a CFV of equal size on pressurization-line regulator 1022, such that when a conveying CFV opens, a pressurization CFV of the same size closes, and when a conveying CFV closes, a pressurization CFV of the same size opens. Note that, since line 301 supplying fluid to the right end of cylinder 1024 and line 302 supplying fluid to the left end of cylinder 1024 are both from input plenum 1003 and are at the same pressure, there is no movement of piston 1023 induced within cylinder 1024, but instead only the pressure differential at piston 945 will cause the movement of piston 1023. As each CFV 1032–1037 is opened, a corresponding one of CFVs 1042–1047 will close, and vice versa. Suppose, for example, CFV 1031 is set to deliver 40% of the total flow, and each of CFVs 1032 through 1037 is set to deliver 10% of the total flow. Then, when valve 1040 is opened, piston 945 is forced to the left stop 942, moving piston 1023 to its left, thus opening flow into CFV 1031 (having 40% of the flow) and CFVs 1032, 1033, 1034, 1035, 1036, and 1037 (10% each), and cutting off flow to 1042, 1043, 1044, 1045, 1046, and 1047. 100% of the flow will go to plenum 1038, and then to conveying line 131. Valve 1040 is then closed, in order to start the flow of the dry product to the output line (e.g., line 135 of FIG. 1). If, for example, pressure regulator 449 is set to 10 psi, then piston 945 will move rightward at a (slowed) rate as set by vent/inlets 927 and/or 928. In some embodiments, vent/inlets 927 and/or 928 are set to allow very fast movement to the left (cutting off pressurization flow and increasing conveying flow if a clog starts to develop or material flow slows, thus increasing the pressure in line 333) but to allow a much slower movement to the right (thus increasing pressurization flow slowly and the corresponding output flow of material 98 from pressure port 110, at the start of an emptying operation, or once the clog or slow-flowing material clears the output line). In some embodiments, CFV 1032 is sized to permit the same flow as CFV 1042, and these are spaced such that when one end of piston 1023 moves and opens CFV 1032, the other end of piston 1023 simultaneously closes CFV 1042. Similarly, CFV 1033 is sized to permit the same flow as CFV 1043, and these are spaced such that when one end of piston 1023 moves and opens CFV 1033, the other end of piston 1023 simultaneously closes CFV 1043, and so on including the left-most CFV 1037, which is sized to permit the same flow as CFV 1047, and these are spaced such that when one end of piston 1023 moves and opens CFV 1037, the other end of piston 1023 simultaneously closes CFV 1047. In the embodiment shown, each CFV 1032–1037 and 1042–1047 are the same size and are spaced at equal center-to-center spacings along cylinder 1024.

Figure 10B:
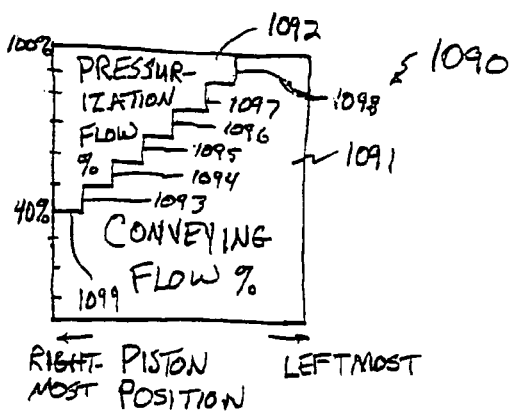
FIG. 10B is a graph of conveying flow and pressurization flow versus piston position for the system of FIG. 10A.

FIG. 10B is a graph of conveying flow and pressurization flow versus piston position for the system of FIG. 10A. In some embodiments, the sum of conveying flow 1091 and pressurization flow 1092 is always substantially a constant (about 100% of input flow 103, with some small losses to vents 928 and 927, and pressure regulator 449). When piston 1023 (and thus also piston 945) is at the right end position (as shown in FIG. 10A), the default minimum conveying flow 1099 to line 131 is obtained through always-open CFV 1031 (e.g., 40% in this example), and the remaining 60% of the flow goes through CFVs 1042, 1043, 1044, 1045, 1046, and 1047 (at 10% each) to the pressurization line 132. As the piston moves to the left, the input port to CFV 1032 is opened and the input port to CFV 1042 is closed at transition point 1093, so the conveying flow increases to 50% and the pressurization flow decreases to 50%. As the piston moves more to the left, the input port to CFV 1033 is opened and the input port to CFV 1043 is closed at transition point 1094, so the conveying flow increases to 60% and the pressurization flow decreases to 40%. As the piston moves still more to the left, the input port to CFV 1034 is opened and the input port to CFV 1044 is closed at transition point 1095, so the conveying flow increases to 70% and the pressurization flow decreases to 30%. As the piston moves yet more to the left, the input port to CFV 1035 is opened and the input port to CFV 1045 is closed at transition point 1096, so the conveying flow increases to 80% and the pressurization flow decreases to 20%. As the piston moves even more to the left, the input port to CFV 1036 is opened and the input port to CFV 1046 is closed at transition point 1097, so the conveying flow increases to 90% and the pressurization flow decreases to 10%. Finally, when the piston is moved to the far left, the input port to CFV 1037 is opened and the input port to CFV 1047 is closed at transition point 1098, so the conveying flow increases to 100% and the pressurization flow drops to zero. As the pistons are moved to the right, the curve is retraced in the opposite direction.

FIG. 11A is a block diagram of a discretely adjustable fluid-flow controller (FFC) system 1100 according to some embodiments of the invention. CFVs 1132–1137 and 1142–1147 are made or adjusted to admit a plurality of different-size flow amounts, as contrasted to FIG. 10A where CFVs 1032, 1033, 1034, 1035, 1036, and 1037 are the same size (10% each), and are the same size as CFVs 1042, 1043, 1044, 1045, 1046, and 1047. For example, in the embodiment shown, end CFVs 1132 and 1142 are larger, as are CFVs 1137 and 1147 on the other end, than the sizes of the middle CFVs 1133–1136 and 1143–1146. In the embodiment shown, CFVs 1132–1137 are each spaced apart the same amount, such that as the piston 1023 moves to the end of its travel, larger increments or decrements of flow are obtained for the same piston movement, while in the center positions, smaller increments or decrements are used. Fluid-flow-regulator system 1101 represents the CFVs and piston that control conveying flow and pressurization flow, while feedback controller 123 represents the pneumatic regulator, speed control, and initialization valve 1040 that control the position of piston 1023.

FIG. 11B is a graph of conveying flow and pressurization flow versus piston position for the system of FIG. 11A. In some embodiments, the sum of conveying flow 1191 and pressurization flow 1192 is always substantially a constant (about 100% of input flow 103, with some small losses to vents 928 and 927, and pressure regulator 449). When piston 1023 (and thus also piston 945) is at the right end position (as shown in FIG. 11A), the default minimum conveying flow 1199 to line 131 is obtained through always-open CFV 1131 (e.g., 36% in this example), and the remaining 64% of the flow goes through CFVs 1142, 1143, 1144, 1145, 1146, and 1147 (at 16% each for 1142 and 1147, and 8% each for 1143–1146) to the pressurization line 132. As the piston moves to the left, the input port to CFV 1132 is opened and the input port to CFV 1142 is closed at transition point 1193 (each changing 16% of the total), so the conveying flow increases to 52% and the pressurization flow decreases to 48%. As the piston moves more to the left, the input port to CFV 1133 is opened and the input port to CFV 1143 is closed at transition point 1194, so the conveying flow increases to 60% and the pressurization flow decreases to 40%. As the piston moves still more to the left, the input port to CFV 1134 is opened and the input port to CFV 1144 is closed at transition point 1195, so the conveying flow increases to 68% and the pressurization flow decreases to 32%. As the piston moves yet more to the left, the input port to CFV 1135 is opened and the input port to CFV 1145 is closed at transition point 1196, so the conveying flow increases to 76% and the pressurization flow decreases to 24%. As the piston moves even more to the left, the input port to CFV 1136 is opened and the input port to CFV 1146 is closed at transition point 1197, so the conveying flow increases to 84% and the pressurization flow decreases to 16%. Finally, when the piston is moved to the far left, the input port to CFV 1137 is opened and the input port to CFV 1147 is closed at transition point 1198, so the conveying flow increases to 100% and the pressurization flow drops to zero. As the pistons are moved to the right, the curve is retraced in the opposite direction.

Figure 12A:
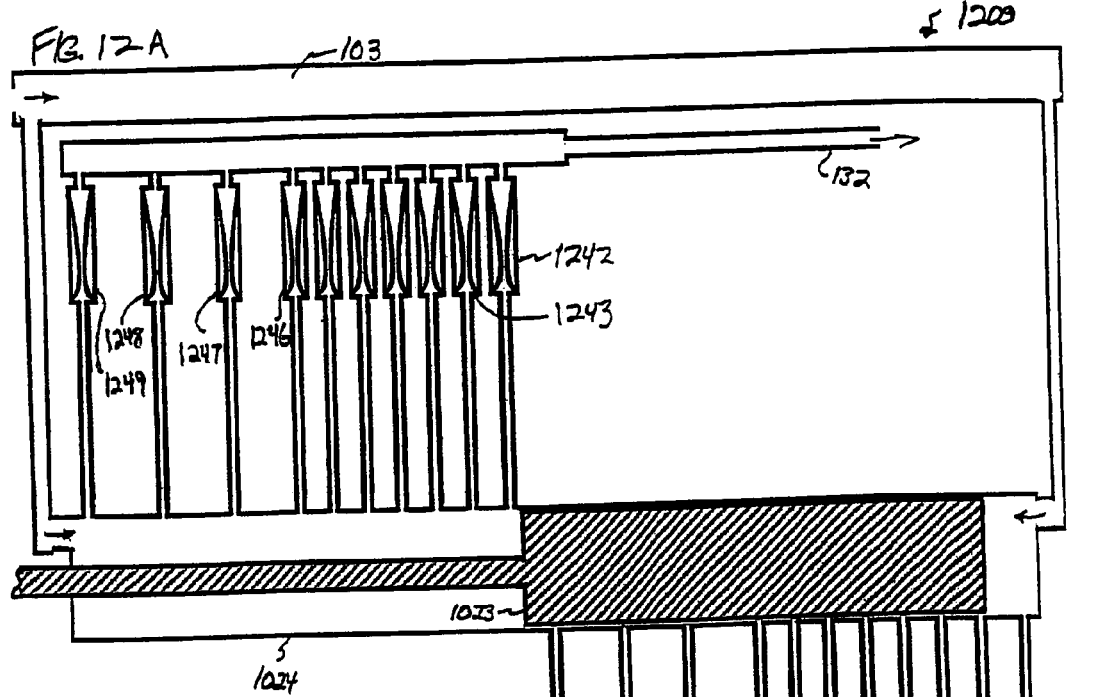
FIG. 12A is a block diagram of a discretely adjustable fluid-flow controller (FFC) system 1200 according to some embodiments of the invention.

FIG. 12A is a block diagram of a discretely adjustable pressure-pot-regulator (PPR) fluid-flow controller (FFC) system 1200 according to some embodiments of the invention. In some embodiments, PPR 1200 is used in place of unit 1101 of FIG. 11A. In the embodiment shown in FIG. 12A, each of the openable/closable CFVs is the same size, however a plurality of different spacings along cylinder 1024 are used. For example, for CFVs 1232 to 1236, a first center-to-center spacing is used (the same first center-to-center spacing is used for CFVs 1242 to 1246), and a different second center-to-center spacing (e.g., twice the size of the first center-to-center spacing) is used between CFVs 1236 to 1239 (the same second center-to-center spacing is used for CFVs 1246 to 1249). In other embodiments, other spacing schemes are used, to create the desired response curve of flow proportions to piston position.

Figure 12B:
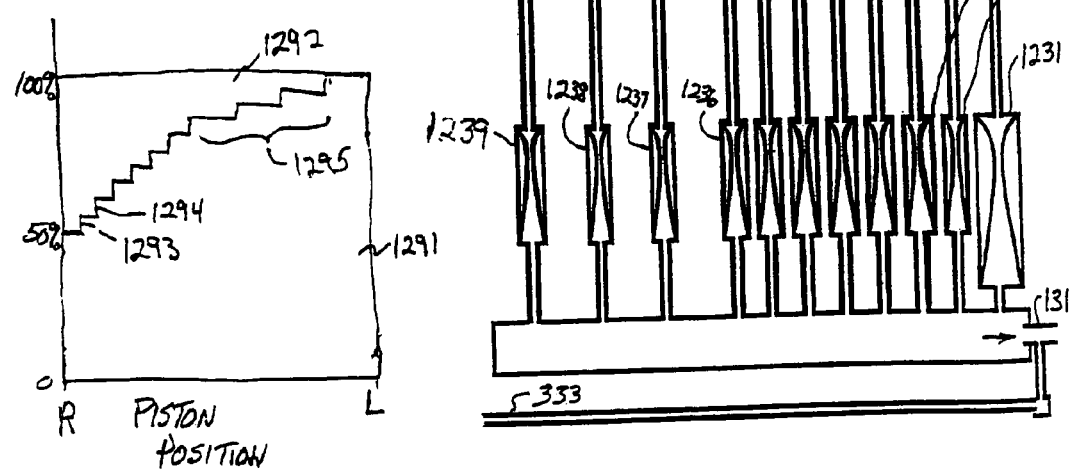
FIG. 12B is a graph of conveying flow and pressurization flow versus piston position for the system of FIG. 12A.

FIG. 12B is a graph of conveying flow and pressurization flow versus piston position for the system of FIG. 12A. In some embodiments, the sum of conveying flow 1291 and pressurization flow 1292 is always substantially a constant (about 100% of input flow 103, with some small losses to vents 928 and 927, and pressure regulator 449). When piston 1023 is at the right end position (as shown in FIG. 12A), the default minimum conveying flow 1099 to line 131 is obtained through always-open CFV 1231 (e.g., 50% in this example), and the remaining 50% of the flow goes through CFVs 1242, 1243–1246, 1247, 1248 and 1249 (at 5% each) to the pressurization line 132. As the piston moves to the left, the input port to CFV 1232 is opened and the input port to CFV 1242 is closed at transition point 1293, so the conveying flow increases to 55% and the pressurization flow decreases to 45%. As the piston moves more to the left, the input port to CFV 1233 is opened and the input port to CFV 1243 is closed at transition point 1294, so the conveying flow increases to 60% and the pressurization flow decreases to 40%. As the piston moves still more to the left, the input ports to CFVs feeding conveying line 131 are successively opened and the input ports of CFVs feeding pressurization line 132 are closed at successive transition points, increasing the conveying flow by 5% and decreasing the pressurization flow 5% each time. As the piston moves yet more to the left, the larger spacings between ports 1236, 1237, 1238, and 1239 mean that the transition points 1295 are further apart (more piston travel between each), so the conveying flow increases to 100% at a slower rate, and the pressurization flow decreases to 0% at the same rate. As the pistons are moved to the right, the curve is retraced in the opposite direction.

Figure 13A:
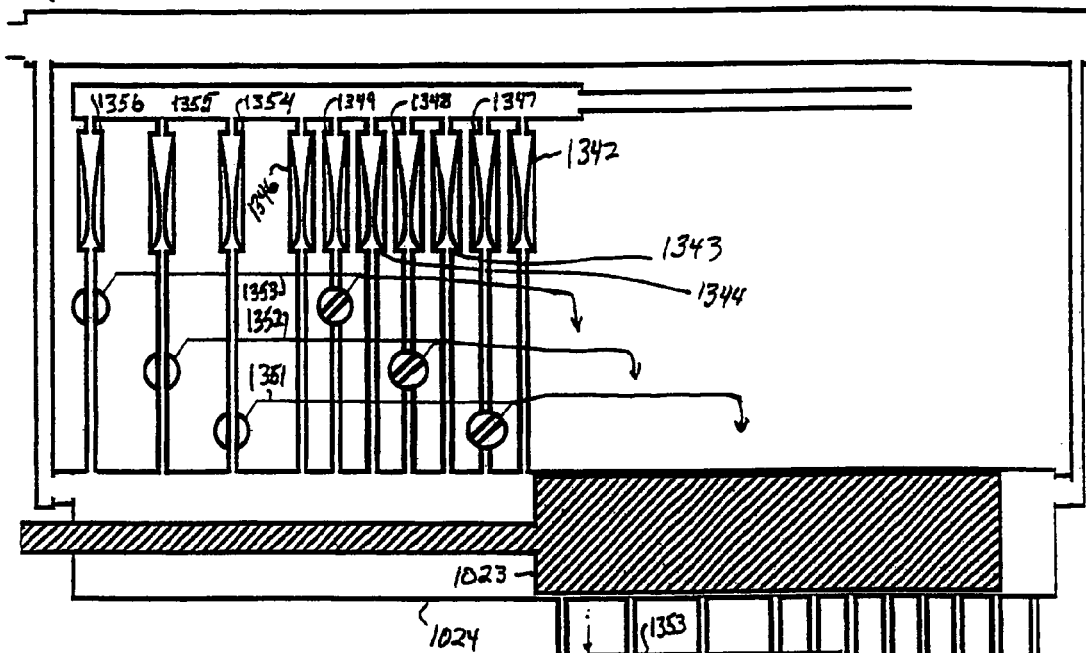
FIG. 13A is a block diagram of a discretely adjustable pressure-pot-regulator (PPR) fluid-flow controller (FFC) system 1300 according to some embodiments of the invention.

FIG. 13A is a block diagram of a discretely adjustable fluid-flow controller (FFC) system 1300 according to some embodiments of the invention. In the embodiment shown, three pairs of conveying-line CFVs have ON-OFF valves that are ganged to three corresponding pairs of ON-OFF valves on pressurization-line CFVs. Thus, in some embodiments, one conveying-line CFV 1331 is always on, and one or more conveying-line CFVs (i.e., 1332, 1333, 1334, and 1337) are unswitched and activateable by piston position. Others of the CFVs are manually or electronically switchable, effectively allowing the positions of CFVs to be moved, while always keeping the total flow constant. Thus, when switch 1351 is in the position shown, the valves to conveying CFV 1337 and to pressurization CFV 1347 are closed, leaving a relatively large spacing between conveying CFVs 1332 and 1333, and their corresponding pressurization CFVs 1342 and 1343, while leaving the valves to conveying CFV 1357 and pressurization CFV 1354 open, allowing their use when the piston is moved to the left enough. Further, when switch 1352 is in the position shown, the valves to conveying CFV 1338 and to pressurization CFV 1348 are closed, leaving a relatively large spacing between conveying CFVs 1333 and 1334, and their corresponding pressurization CFVs 1343 and 1344, while leaving the valves to conveying CFV 1358 and pressurization CFV 1355 open, allowing their use when the piston is moved further to the left. Finally, when switch 1353 is in the position shown, the valves to conveying CFV 1339 and to pressurization CFV 1349 are closed, leaving a relatively large spacing between conveying CFVs 1334 and 1336, and their corresponding pressurization CFVs 1344 and 1346, while leaving the valves to conveying CFV 1359 and pressurization CFV 1356 open, allowing their use when the piston is moved to the far left. Note that switch 1351 controls four valves, two of which are open and two of which are closed. Switches 1352 and 1353 also each control four valves. Thus, the total flow will remain constant for any piston position, but based on the positions of the switches, the response curve can be changed.

Figure 13B:
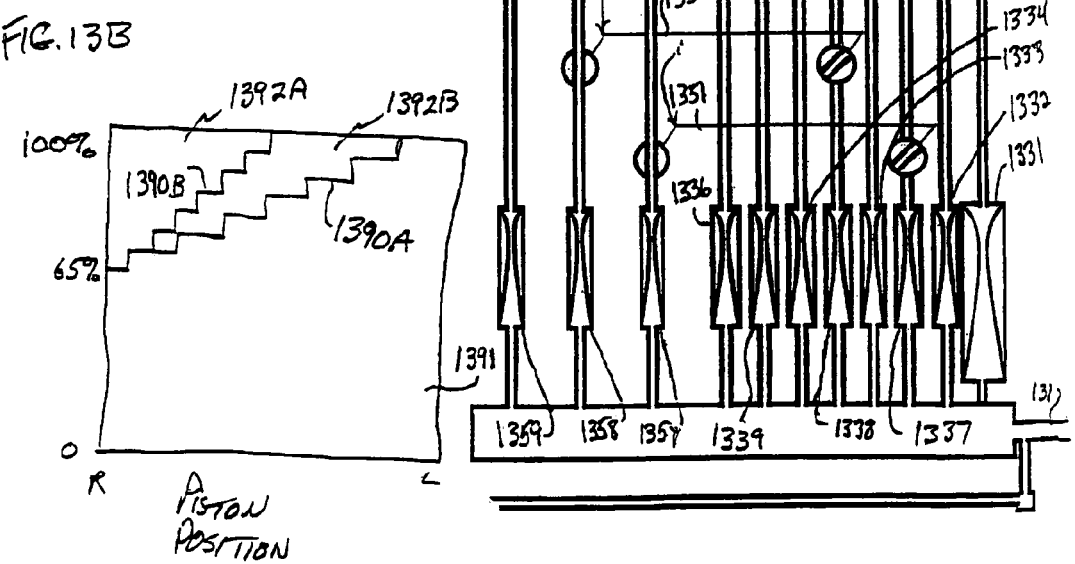
FIG. 13B is a graph of two response curves of conveying flow and pressurization flow versus piston position for the system of FIG. 13A.

FIG. 13B shows a graph of two of the possible response curves for the system of FIG. 13A. Curve 1390A is the response curve when switches 1351, 1352, and 1353 are in the positions shown in FIG. 13A. Response curve 1390B is obtained when the switches 1351, 1352, and 1353 are all in the opposite positions (closing CFVs 1354–1356 and CFVs 1357–1359, regardless of piston position), and opening the possibility of flow to CFVs 1337, 1338, 1339, and correspondingly to CFVs 1347, 1348, and 1349, based on piston position. Thus, the transition point spacings can be altered easily by toggling a few switches, while ensuring that the total flow is always substantially 100%.

Figure 14A:
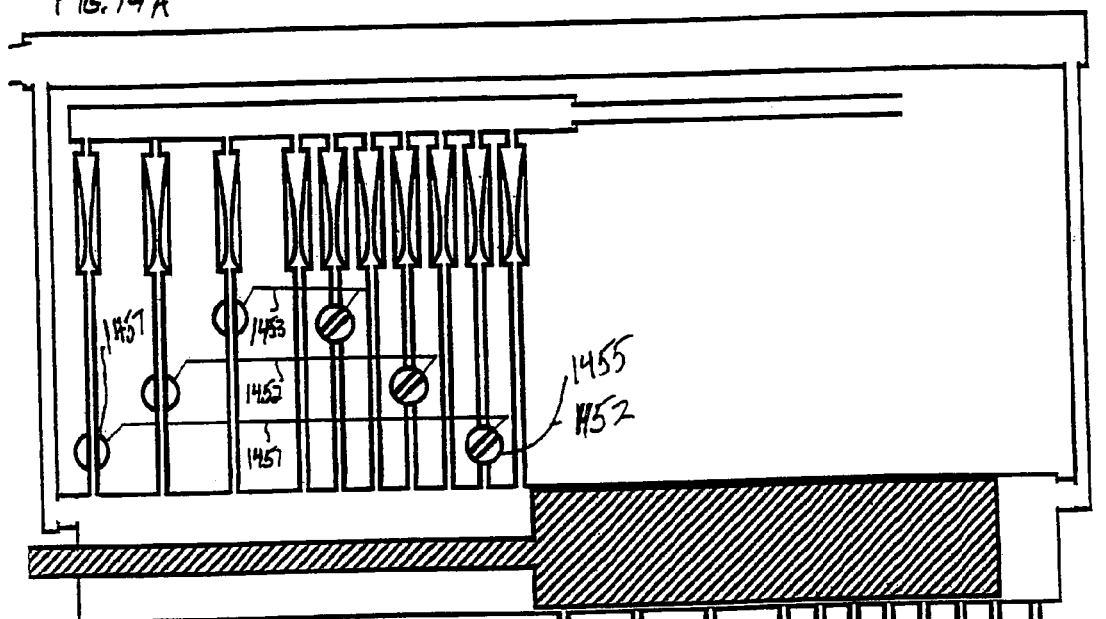
FIG. 14A is a block diagram of a discretely adjustable fluid-flow controller (FFC) system 1400 according to some embodiments of the invention.

FIG. 14A is a block diagram of a discretely adjustable fluid-flow controller (FFC) system 1400 according to some embodiments of the invention. Here, the switches that enable and disable pairs of valves, provide different possible response curves. For example, switch 1451 controls four valves that, in the position shown enable the far-left valves 1457 and 1459, and disable the far-right valves 1454 and 1455, leaving a larger space between CFVs at the far left and far right, and closer spacings for the middle valves. Switch 1452 is next, shrinking the fine-granularity middle spacing and increasing the amount of the range at the edges.

Figure 14B:
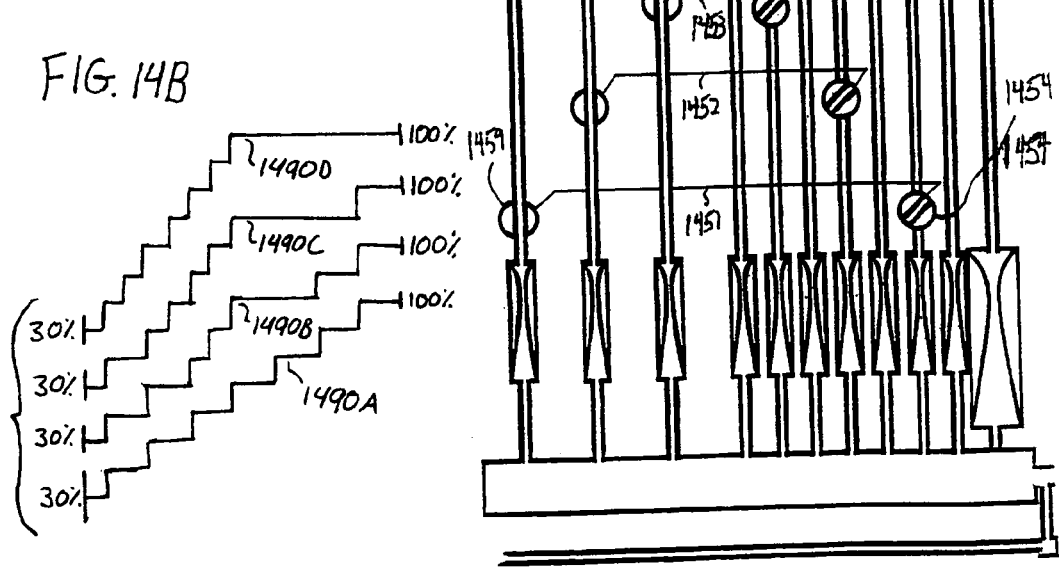
FIG. 14B is a graph of response curves of conveying flow and pressurization flow versus piston position for the system of FIG. 14A.

FIG. 14B shows a graph of two of the possible response curves for the system of FIG. 14A. Curve 1490A is the response curve when switches 1451, 1452, and 1453 are in the positions shown in FIG. 14A. Response curve 1490D is obtained when the switches 1451, 1452, and 1453 are all in the opposite positions. Response curves 1490B and 1490C are obtained when some of the switches are in the position shown, and others are in the opposite positions. Response curve 1490C is obtained when the switch 1451 is in the position shown, and 1452 and 1453 are in the opposite positions. Thus, the transition point spacings can be altered easily by toggling a few switches, while ensuring that the total flow is always substantially 100%.

FIG. 15 is a block diagram of a fluid-flow-control system 1500 of some embodiments of the invention, which, in contrast to system 100 of FIG. 1, empties material upward with conveying fluid moving at the upper portion of pressure pot 1510, and pressurization fluid entering pressure pot at the lower end. In some embodiments, pressure pot 1510 includes a valved loading port 1509 through which additional material 98 (e.g., dry material such as an edible food coating or confectioner's sugar to be sprayed onto foodstuff) can be added. An air-permeable screen, ceramic, or membrane 1530 supports the material 98 without it falling through, and allows pressurization fluid 130 (e.g., air) to pass upward, which lifts and fluidizes material 98 toward output nozzle 1514. In some embodiments, a motor 1520 (such as a pneumatic motor), by shaft 1521, drives one or more agitators 1522 that stir and loosen material 98. Conveying air 134 from conveying line 131 passes through, e.g., in some embodiments, a straight pipe having a T-type side entry in place of venturi 1515, and in other embodiments, having a venturi 1515 pulling material into and through pipe 1514 and pushing and conveying material 98 toward output 136. FFC 120 uses signal 133 (e.g., a pressure of air 134) to control the proportion of conveying fluid 131 to pressurization fluid 132, in order to optimize the amount of material 98 being moved. In some embodiments, if signal 133 shows an increase in pressure, FFC 120 increases the conveying flow 131 and/or decreases the pressurization flow 132.

Figure 16A:
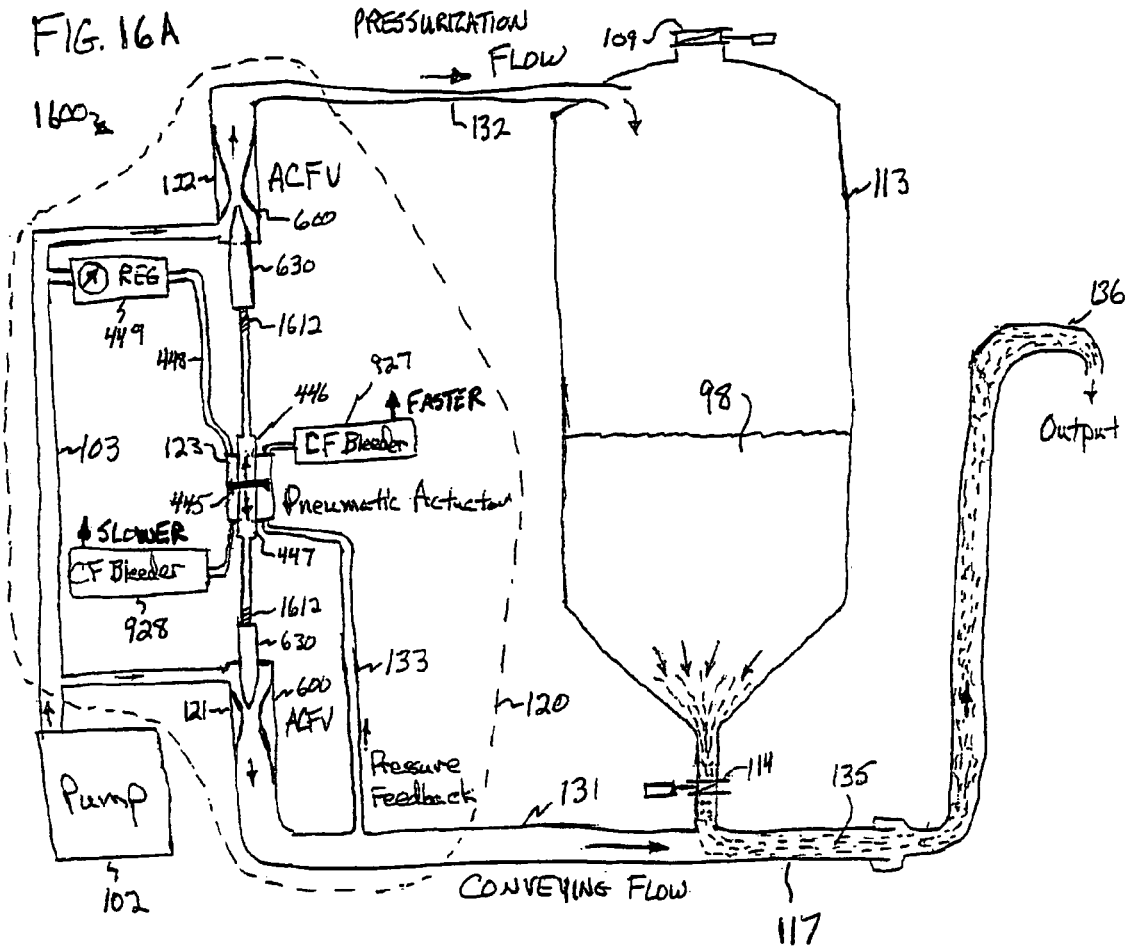
FIG. 16 is a block diagram of a fluid-flow-control system 1600 of some embodiments.

FIG. 16A is a block diagram of a fluid-flow-control system 1600 of some embodiments. System 1600 uses adjustable CFVs 600 that each provide the same constant change in cross-sectional area of their venturi openings per unit change in the position of piston 445. Most of the elements of FIG. 16 are as described above for elements using the same reference numbers. In some embodiments, adjustment screws 1612 are added to allow one to adjust the total flow (screwing them to move pintles 630 closer to one another increases total flow), as well as to individually adjust each of the pressurization flow to piston position and conveying flow to piston position. The flow in regulator line 448 and pressure-feedback line 133 are forced to be one-way (e.g., by one-way valves, not shown), such that the upward movement speed of piston 445 (reducing the pressurization flow and increasing the conveying flow) is independently set by the venting rate of constant-flow bleeder 927 (such as, e.g., a relatively larger CFV to increase the shutdown speed of material flow, in some embodiments), while the downward movement speed of piston 445 (increasing the pressurization flow and reducing the conveying flow) is set by the venting rate of constant-flow bleeder 928 (such as, e.g., a relatively smaller CFV to slowly increase rate material flow once low conveying pressure is achieved, in some embodiments).

Figure 16B:
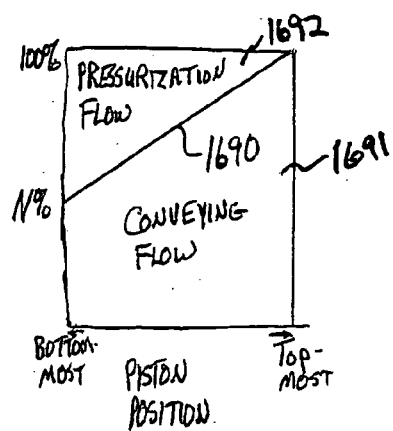

FIG. 16B shows a graph of the response curve for the system of FIG. 16A. Curve 1690 is the straight-line response curve, wherein the pintles 630, screw adjustments 1612, and piston stops are set to provide a minimum conveying flow (e.g., N %) when piston 445 is in the lower-most position on the Figure, and a maximum conveying flow (e.g., 100%) when piston 445 is in the upper-most position on the Figure. Response curve 1690 provides a smooth linear directly proportional relationship between piston position and proportion of flow rates between conveying flow and pressurization flow, in contrast to response curve 1090 of FIG. 10B, which shows discrete steps having a granularity that is based on the number of discrete CFVs used in FIG. 10A. The total flow (the sum of pressurization flow 1692 and conveying flow 1691) is always substantially 100%. With a large-enough number of CFVs in FIG. 10A, curve 1090 could approach the smoothness of curve 1690.

Figure 17A:
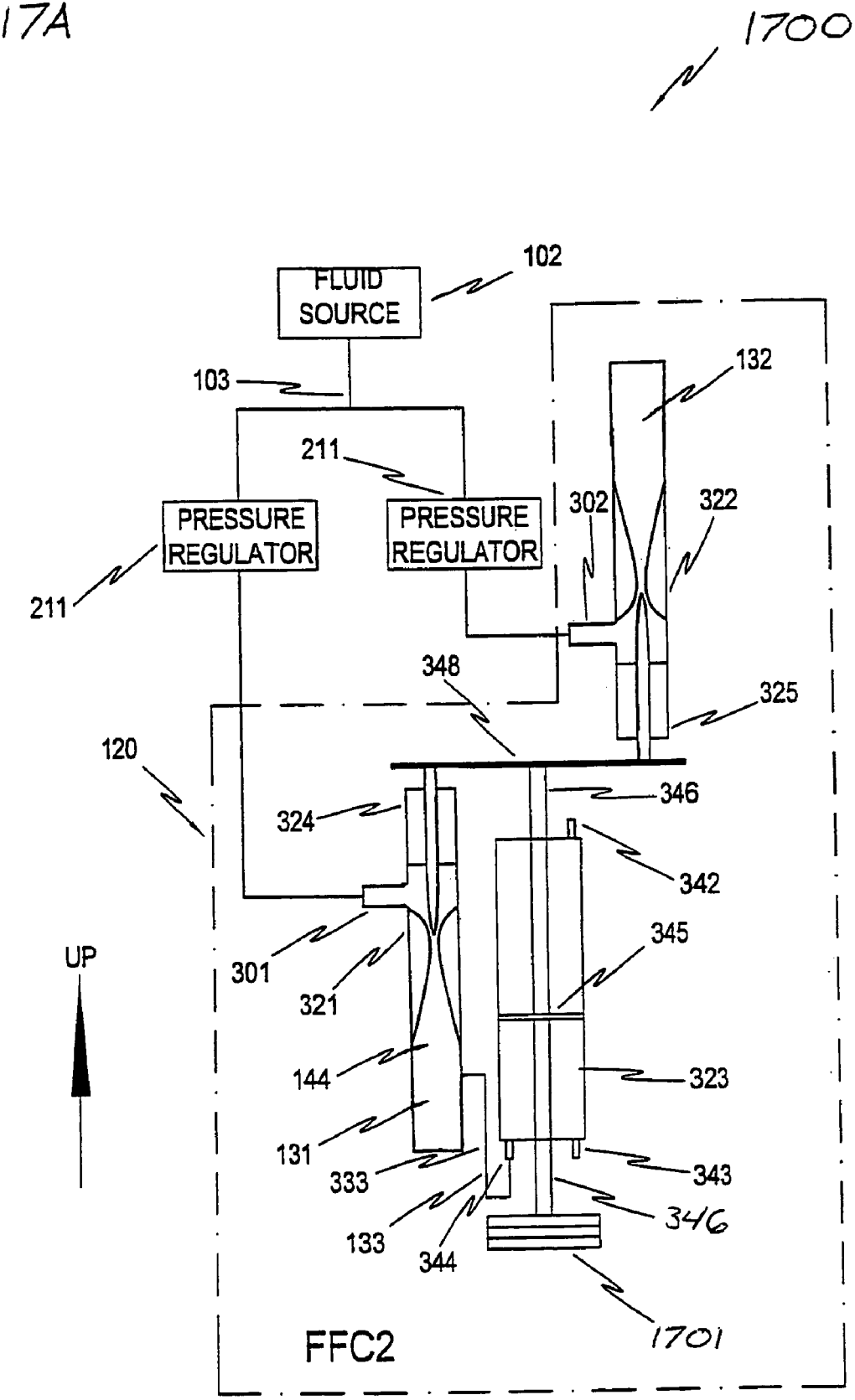
FIG. 17A is a block diagram of a two-line fluid-flow controller (FFC2) system 1700 according to some embodiments of the invention.

FIG. 17A is a block-diagram of an FFC2 1700, according to some embodiments. In some embodiments, two-line fluid-flow controller 1700 uses gravity and a fixed or variable weight stack to set the desired set-point pressure that is used by FFC2 1700 to regulate flow. In some embodiments, pneumatic cylinder 323 (which corresponds to and can be used as the feedback controller 123 of FIG. 1) is vertically oriented and is regulated by weight stack 1701 attached and hanging from the base end of pneumatic cylinder 323 by rod 346. An increase in pressure from feedback signal through interconnect line 333 pushes the piston 345 one direction (e.g., vertically upward in FIG. 17A) and the weight stack 1701 pushes the piston 345 the opposite direction. In some embodiments, weight stack 1701 is manually adjustable, wherein by adding additional weights to weight stack 1701 the desired pressure value in conveying line 131 is achieved. In some embodiments, piston 345 is connected via rods 346 and 348 to pintles 324 and 325 such that as pressure in the conveying line 333 (connected to port 344 of cylinder 323) increases, piston 345 moves vertically upward, weight stack 1701 moves vertically upward, and the 'open' area on venturi #1 (CFV 321) increases, with a corresponding decrease in the 'open' area on venturi #2 (CFV 322). Such an increase in pressure in conveying line 333 would thereby increase the flow of air in conveying line 131 and decrease the air flow in pressurization line 132.

Figure 17B:
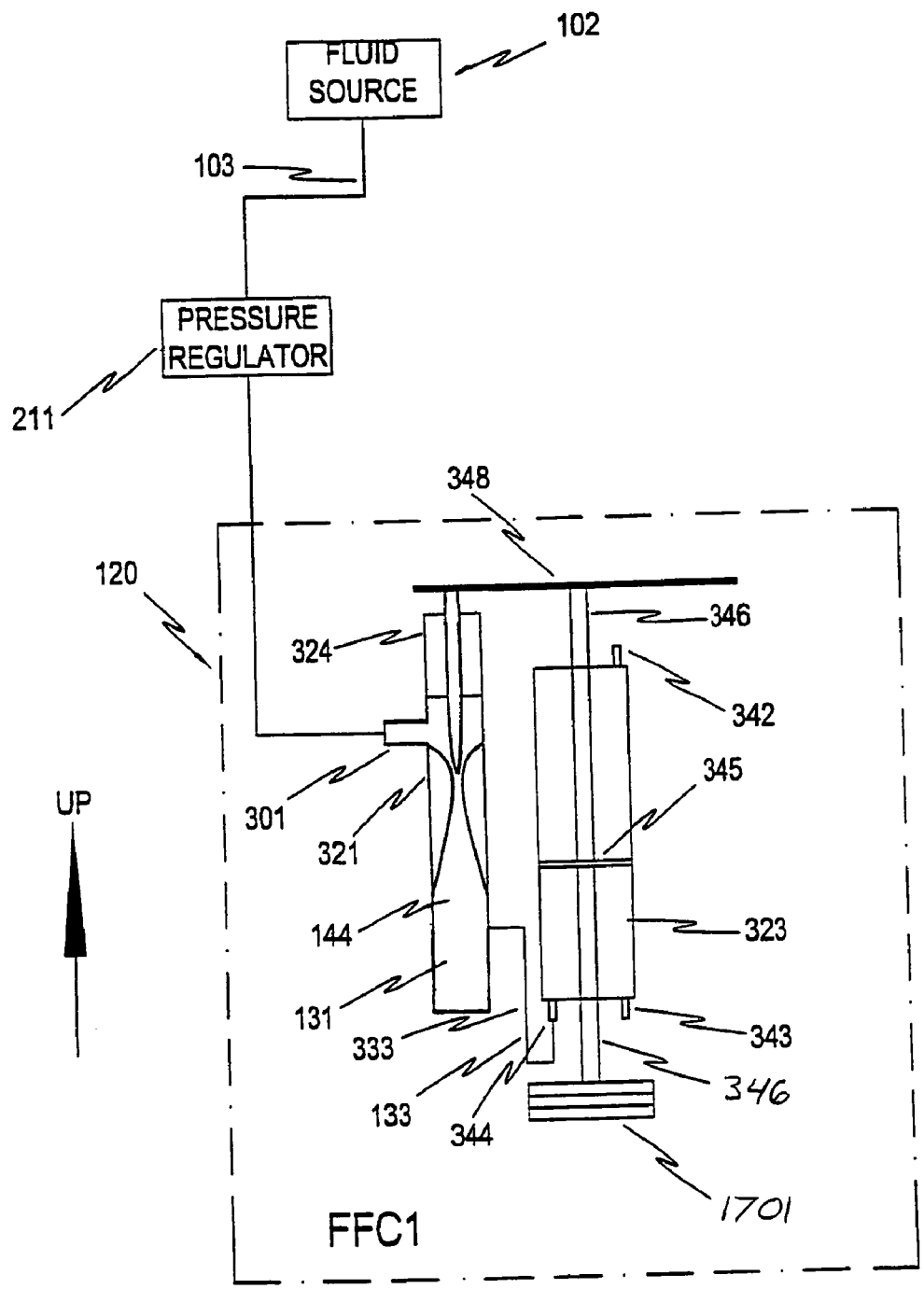
FIG. 17B is a block diagram of a one-line fluid-flow controller (FFC1) system 1750 of some embodiments.

FIG. 17B is a block-diagram of a fluid-flow controller (FFC1) 1750, according to some embodiments. In some embodiments, pneumatic cylinder 323 is vertically oriented and regulated by weight stack 1701 attached to the base of pneumatic cylinder 323 by rod 346 and is connected to only one line of the fluid-flow-control system (e.g., conveying line 131 in FIG. 17B). In some such embodiments, the alternate line (e.g., pressurization line in FIG. 17B) remains at a constant pressure and air flow and is not controlled by FFC1 1750.

Figure 17C:
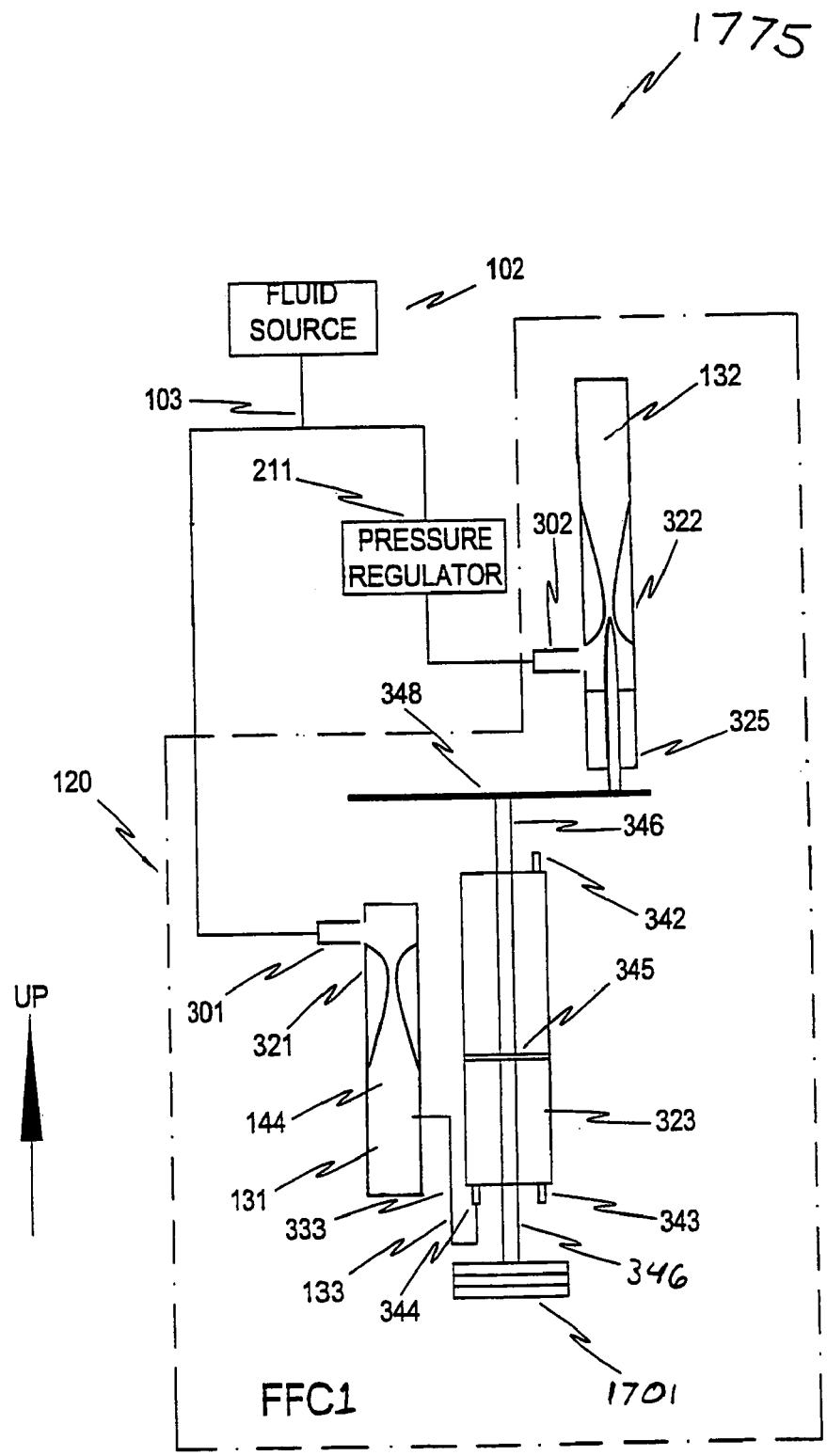
FIG. 17C is a block diagram of a one-line fluid-flow controller (FFC1) system 1775 of some embodiments.

FIG. 17C is a block-diagram of an FFC1 1775 of some embodiments. In some embodiments, pneumatic cylinder 323 regulates only one line of the fluid-flow-control system (e.g., pressurization line 132 in FIG. 17C) and the alternate line (e.g., conveying line 131 in FIG. 17C) remains at a constant pressure and air flow is not controlled by FFC1 1775. Control of air pressure in pressurization line 132 remains as described in FIG. 17A.

Figure 18:
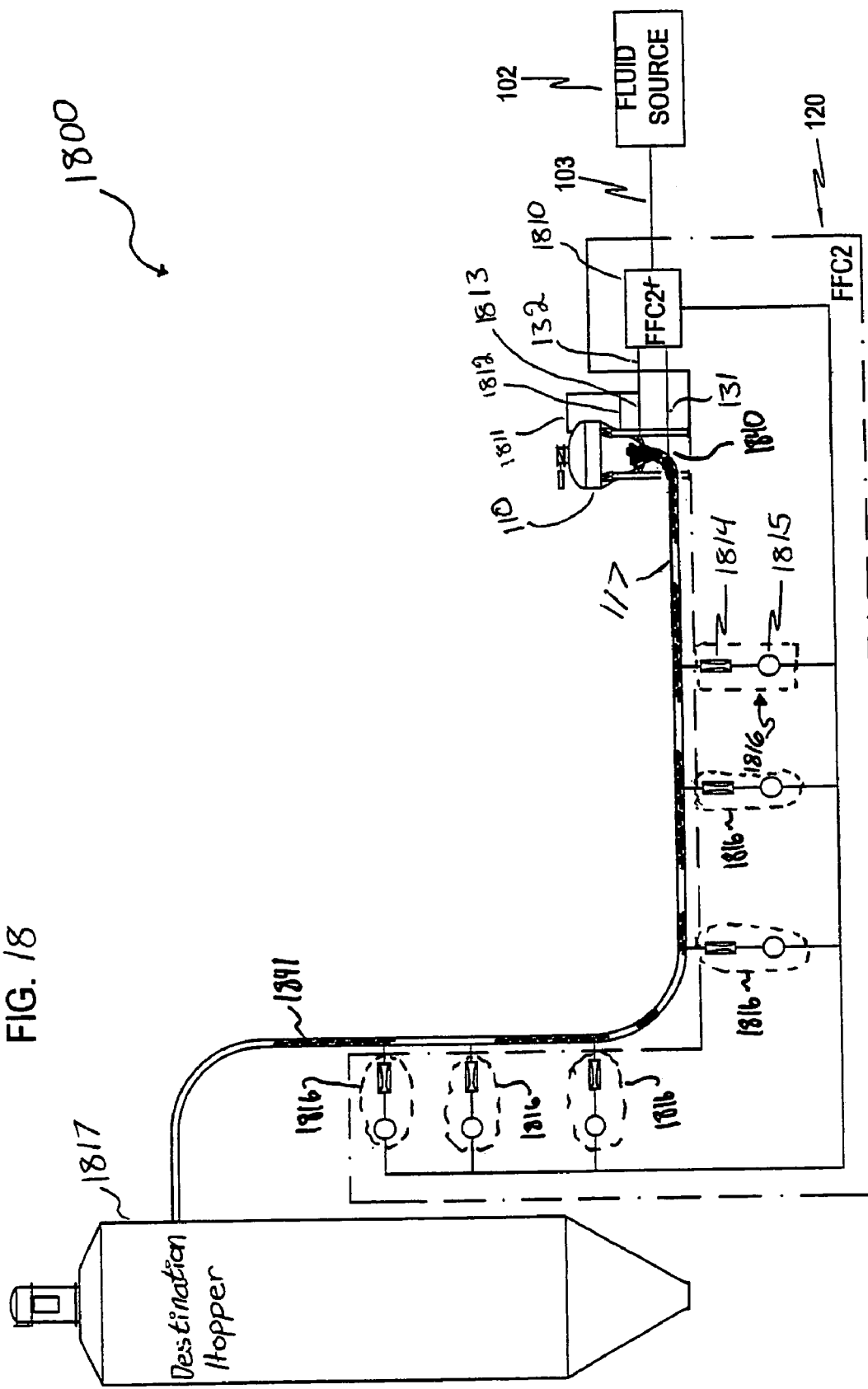
FIG. 18 is a block diagram of a fluid-flow-control system 1800 according to some embodiments of the invention.

FIG. 18 is a block-diagram of a fluid-flow-control system 1800 of some embodiments of the invention. In some embodiments, fluid source 102 provides air through source line 103 to fluid-flow controller (FFC2+) 1810. Fluid-flow controller 1810 feeds air to pressure pot 110 through pressurization line 132. In some embodiments, pressurization line 132 divides into lines 1811, 1812, and 1813 which feed air into different locations (e.g., the top, middle, and bottom) of pressure pot 110, respectively. Fluid-flow controller 1810 also feeds air through conveying line 131 into the head end 1840 of output line 1841. Additional air is provided to output line 1841 through conveying-fluid boosters 1816, each of which includes a pressure regulator 1815 and a CFV flow regulator or valve 1814. These boosters 1816 are located downstream from pressure pot 110 at a plurality of additional downstream locations. In some embodiments, FFC2+ 1810 obtains a pressure parameter from one or more locations on output line 1841, and adjusts the flow through one or more boosters 1816 (i.e., increased pressure causing increased flow), and, in some embodiments, decreases the flow to pressurization line 132 by an equal amount. In other embodiments, boosters 1816 each provide constant boosting flow-rates into output line 1841. In still other embodiments, boosters 1816 each provide variable flow-rates into output line 1841 independently of fluid-flow controller 1810, but based on air pressure values detected at various locations downstream from pressure pot 110 as material 98 flows to destination hopper 1817 (in some embodiments, as described below for FIG. 19).

Figure 19:
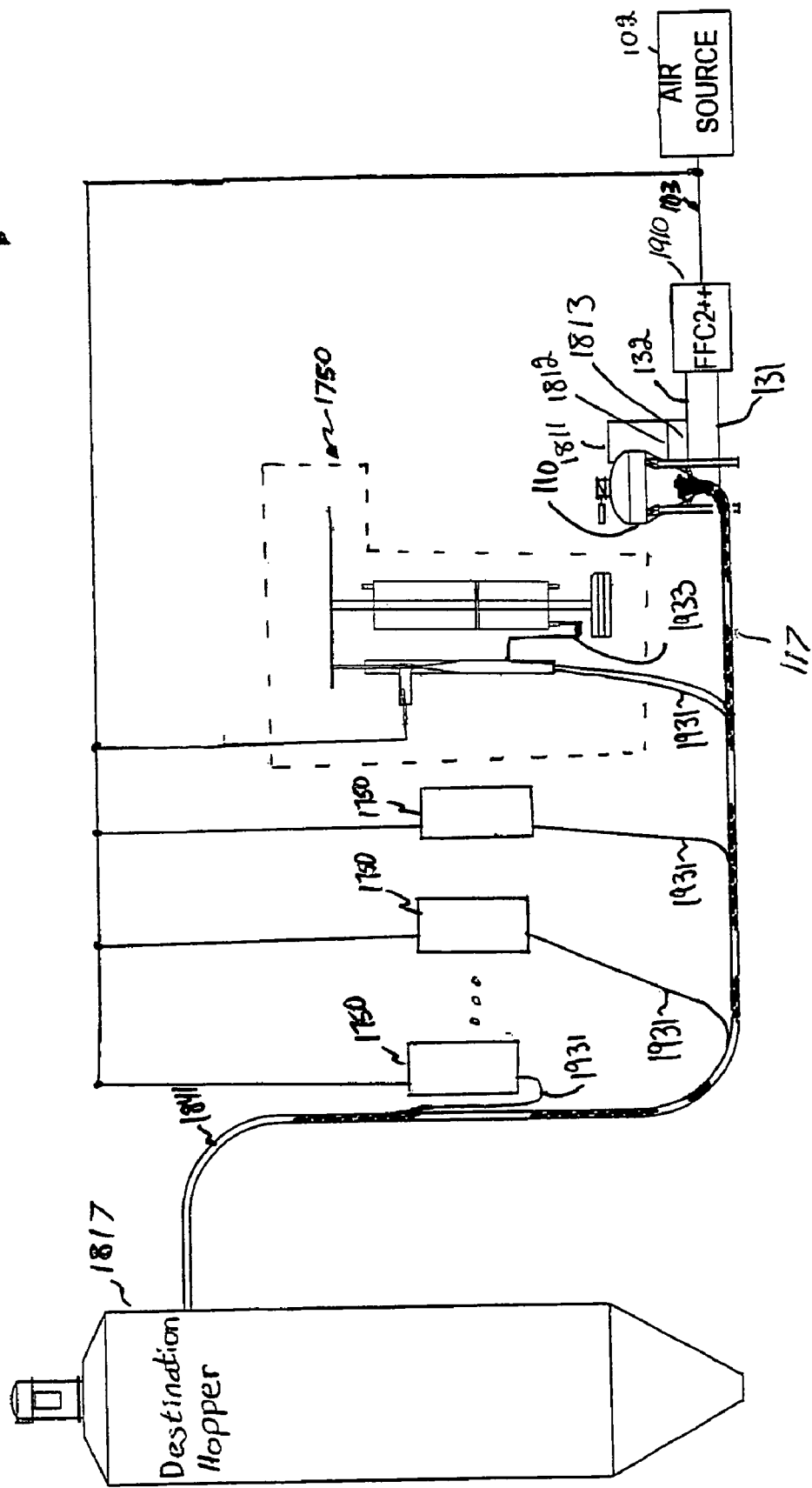
FIG. 19 is a block diagram of a fluid-flow-control system 1900 of some embodiments.

FIG. 19 is a block-diagram of a fluid-flow-control system 1900 of some embodiments of the invention. In some embodiments, fluid-flow controller (FFC2++) 1910 feeds air into pressurization line 132 and conveying line 131. Pressurization line 132 divides further into lines 1811, 1812, and 1813 which feed air into the top, middle, and bottom of pressure pot 110, respectively. Flow into and through output line 1841 is further adjusted at one or more downstream locations each having a fluid-flow controller 1750 attached to output line 1841 at those additional locations downstream from pressure pot 110. In some such embodiments, a pressure signal 1933 obtained from the supplemental conveying-line 1931 just before its respective connection at each downstream location on output line 1841 controls its respective FFC1 1750, regulating the injected downstream air flow at that point.

Figure 20:
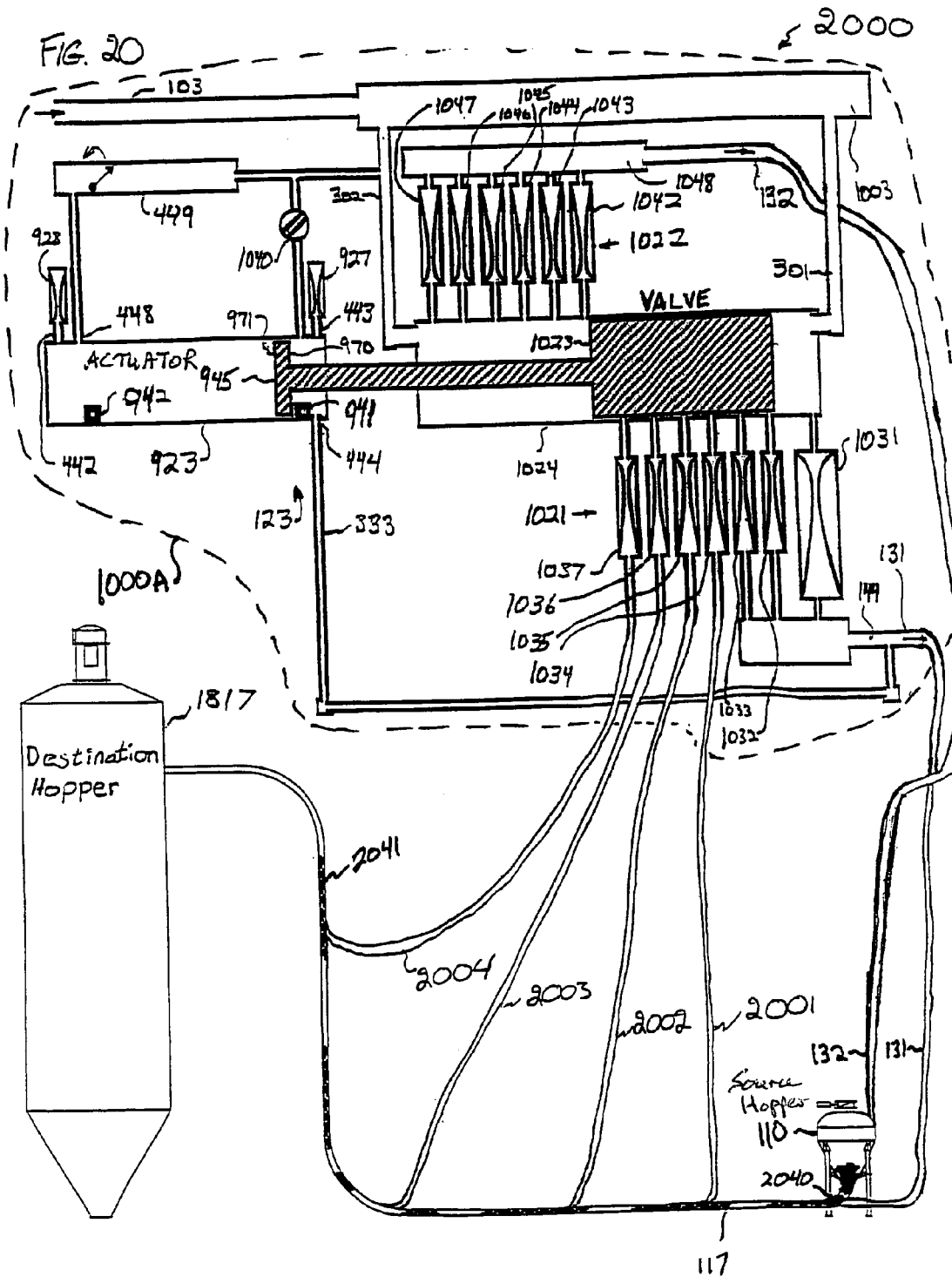
FIG. 20 is a block diagram of a fluid-flow-control system 2000 according to some embodiments.

FIG. 20 is a block diagram of a fluid-flow-control system 2000 according to some embodiments. In some embodiments, fluid-flow controller 1000A (similar to FFC 1000 shown and described in FIG. 10A) feeds fluid into pressurization line 132 and conveying line 131, however not all of the CFVs of conveying-line regulator 1021 feed into conveying line 131. As shown in FIG. 10A, fluid-flow controller 1000A includes a piston valve 1023 that moves according to pressure values in actuator 923 in order to cover and open individual ones of the CFVs of conveying-line regulator 1021 and pressurization-line regulator 1022 for the conveying line 131 and pressurization line 132, respectively. In some embodiments, CFV 1031 is always open and feeds a minimum flow to conveying line 131. In some embodiments, only a subset of conveying-line CFVs (e.g., CFVs 1031, 1032 and 1033 in the embodiment shown) combine their outputs in conveying line 131 to provide air flow to the head-end 2040 of the output line 2041 that empties the pressure pot 110. In some such embodiments, conveying-line CFVs 1034, 1035, 1036 and 1037 each connect to different downstream ports into output line 2041 via tubes 2001, 2002, 2003 and 2004, respectively, at successive locations downstream from the pressure pot. As valve 1023 shifts leftward to successively open conveying line CFVs 1032 and then 1033 into conveying line 131, the fixed pressurization line venturis 1042 and then 1043 are covered, reducing the flow into pressurization line 132. However, as piston valve 1023 moves further left, it successively opens CFVs 1034–1037 that provides additional conveying fluid through lines 2001–2004, respectively, each to a different downstream port in output line 2041, and simultaneously, piston valve 1023 successively closes CFVs 1044–1047, respectively, reducing the flow into pressurization line 132 by the same amounts as is simultaneously being successively inserted into the conveying flow. CFVs 1034, 1035, 1036 and 1037 function to further add conveying air at downstream locations and regulate air pressure in output line 2041 as materials travel from the pressure pot 110 to the destination hopper 1817.

Figure 21:
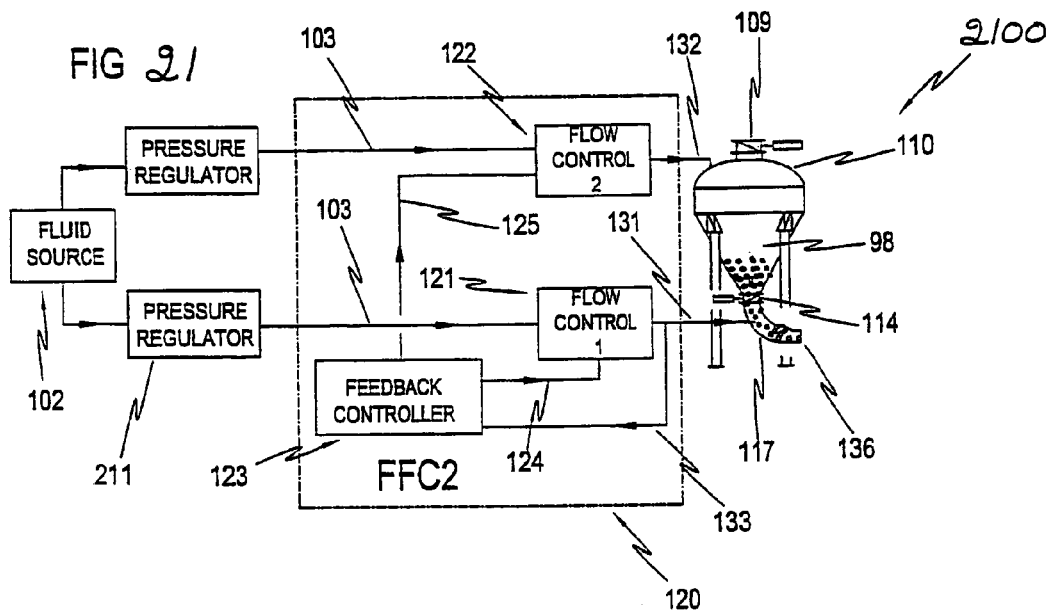
FIG. 21 is a block diagram of a fluid-flow-control system 2100 of some embodiments of the invention.

FIG. 21 is a block diagram of a fluid-flow-control system 2100 including an FFC2 120. In some embodiments, FFC2 feeds into pressure pot 110 through pressurization line 132 and conveying line 131. Filler valve 109, when open, permits material to be loaded into pressure pot 110, and when closed, permits pressurization via pressurization line 132.

In some embodiments of FIG. 21, flow control 1 (FC1) 121, is a single critical-flow venturi, whereas in other embodiments it is an adjustable critical-flow venturi, or in still other embodiments multiple discrete critical-flow venturis. In some embodiments of FIG. 21, flow control 2 (FC2) 122 is a single critical-flow venturi, whereas in other embodiments it is an adjustable critical-flow venturi, and in still other embodiments it is multiple discrete critical-flow venturis. The fluid source 102 is a positive displacement blower in some embodiments, while in other embodiments it may be an air compressor, centrifugal blower, or other suitable pressure source. The fluid source 102 may also include an internal regulator and/or pressure regulator 211 to control the pressure delivered to FC1 and FC2. In some embodiments, feedback controller 123 is a single mechanical device with a direct linkage to FC1 121 and FC2 122, while in other embodiments feedback controller is two mechanical devices with separate linkages to FC1 121 and FC2 122. In still other embodiments feedback controller 123 is an electrical device or devices (such as a programmable logic controller or a computer) providing electrical control for FC1 121 and FC2 122. Feedback controller 123 may also be a combination mechanical and electrical device or devices (such as a PLC providing electrical output to a pneumatic cylinder) providing control for FC1 121 and FC2 122. As pressure in product output line 117 increases, signal 133 to feedback controller 123 causes an increased conveying flow 131 from FC1 121 and/or a decreased pressurization flow 132 from FC2 122.

Figure 22:
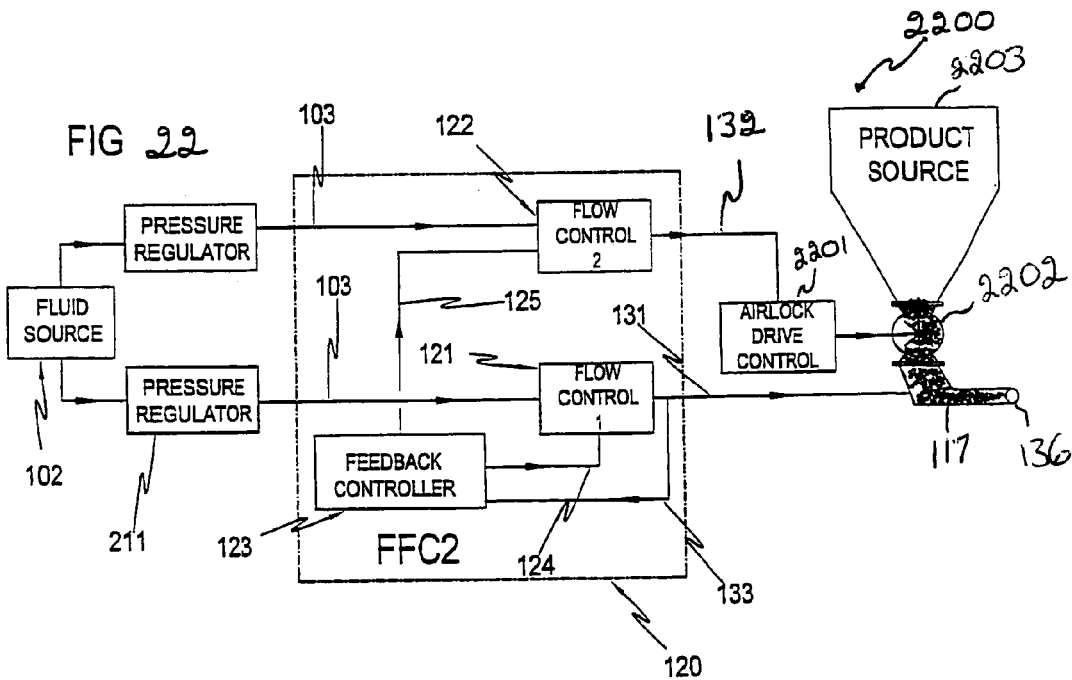
FIG. 22 is a block diagram of a fluid-flow-control system 2200 of some embodiments.

FIG. 22 is a block diagram of a fluid-flow-control system 2200 including an FFC2 120. In some embodiments, FFC2 is attached to airlock drive control 2201 via pressurization line 132. In some embodiments, airlock drive control 2201 drives airlock 2202, which includes multiple "airlock" compartments which rotate to empty materials from product-source hopper 2203 into the conveying line, such that the materials then enter conveying line 117. In some embodiments, use of rotary valve (or airlock) 2202 may allow air leakage from conveying line 117 and loss of air pressure around rotary valve 2202 to an area of lower pressure in the hopper, which could also cause backflow of material. Therefore, in some embodiments, the top of hopper 2203 is sealed to prevent such air and/or material backflow (i.e., once a sufficient amount of air has leaked, the hopper pressure will equal the conveying line pressure, thus preventing further leakage). In some embodiments, rotation of rotary valve 2202 is controlled based on conveying-line pressure measurements and/or signals, wherein rotating the valve 2202 allows additional material through valve 2202 when conveying-line pressure is low (meaning that there is not enough material to cause backpressure to build up, so more material should be placed in the conveying line), and reducing product material flow through valve 2202 when conveying-line pressure is high. To increase material flow through valve 2202, air flow in pressurization line 132 through airlock drive control 2201 is increased, thereby increasing pressure in valve 2202 and forcing valve 2202 to rotate at a faster rate allowing more material to flow into conveying line 117. This air flow into valve 2202 is decreased when pressure in the conveying line is too high, thereby reducing the rate of rotation of valve 2202 and decreasing material flow into conveying line 117.

In some embodiments of FIG. 22, flow control 1 (FC1) 121, is a single critical-flow venturi, whereas in other embodiments it is an adjustable critical-flow venturi, or in still other embodiments multiple discrete critical-flow venturis. In some embodiments of FIG. 22, flow control 2 (FC2) 122 is a single critical-flow venturi, whereas in other embodiments it is an adjustable critical-flow venturi, and in still other embodiments it includes a plurality of discrete critical-flow venturis. The fluid source 102 is a positive displacement blower in some embodiments, while in other embodiments it may be an air compressor or a centrifugal blower. The fluid source 102 may also include a regulator to control the pressure delivered to FC1 121 and FC2 122. In some embodiments, feedback controller 123 is a single mechanical device with a direct linkage to FC1 121 and FC2 122, while in other embodiments feedback controller is two mechanical devices with separate linkages to FC1 121 and FC2 122. In still other embodiments, feedback controller 123 is an electrical device or devices (such as a programmable logic controller or a computer) providing electrical control for FC1 121 and FC2 122. Feedback controller 123 may also be a combination mechanical and electrical device or devices (such as a PLC providing electrical output to a pneumatic cylinder) providing control for FC1 121 and FC2 122.

FIG. 23 is a block diagram of a fluid-flow-control system 2300 including an FFC1 120. In some embodiments, air travels from the fluid source 102 to pressure regulator 211. From pressure regulator 211 air flow travels to flow control 1 (FC1) 121 then to conveying line 131. A feedback signal 133 is sent from conveying line 131 to feedback controller 123 and back to FC1 121. In some embodiments, a rotary valve (or airlock) 2202 may be used to regulate the expulsion of materials from product-source hopper 2203 into conveying line 117. Valve 2202 includes multiple "airlock" compartments which rotate to empty materials. In some embodiments, leakage of rotary valve (or airlock) 2202 may allow air leakage from conveying line 117 and loss of air pressure around rotary valve 2202 to an area of lower pressure in the hopper, which could also cause backflow of material. Therefore, in some embodiments, the top of hopper 2203 is sealed to prevent such air and/or material backflow by allowing hopper pressure to equal conveying line pressure once a sufficient amount of air has leaked, thereby preventing further leakage. Rotation of rotary valve 2202 is also used to equalize pressure and is controlled based on conveying-line pressure measurements and/or signals. When pressure in the conveying line is low (i.e. there is not enough material to cause backpressure to build up, so more material should be placed in the conveying line), the rotation speed of valve 2202 is increased, allowing additional material to flow into the conveying line. When material flow through valve 2202 is too high, product material flow through valve 2202 into conveying line 117 is reduced by reducing the valve's rate of rotation.

In some embodiments of FIG. 23, flow control 1 (FC1) 121, is a single flow venturi, whereas in other embodiments it is an adjustable flow venturi, or in still other embodiments multiple discrete critical flow venturis. The fluid source 102 is a positive displacement blower in some embodiments, while in other embodiments it may be an air compressor or a centrifugal blower. The pressure source may also include a regulator to control the pressure delivered to FC1 121. In some embodiments, feedback controller 123 is a mechanical device such as FIG. 3B, while in other embodiments it is a mechanical device such as FIG. 4B. In still other embodiments, feedback controller 123 may be a mechanical device such as FIG. 17B.

Fox-Brand Adjustable-Area Critical-Flow Venturi Valves

In some embodiments, the invention uses adjustable-area CFVs available from Fox Valve Development Corp., Hamilton Business Park, Dover, N.J. 07801 USA. Fox-brand adjustable-area critical-flow venturi valves provide high-precision throttling and adjustment of liquid and gas flows unaffected by downstream pressure. (Upstream pressure is that between the fluid source and the CFV, while downstream pressure is that after the flow passes through the CFV.) Fox adjustable-area venturi valves are designed to provide high accuracy flow regulation over a broad flow range, while maintaining critical flow (with gasses) or cavitation (with liquids). This means that with a fixed inlet pressure, the valve can be set to create a fixed, accurate flow rate that is unaffected by fluctuations in downstream pressure, as long as downstream pressure remains below about 85% to 88% of the upstream pressure. Fox venturi valves have been used in industrial research and ground-support test equipment, and have been qualified for flight hardware. They have flown on SpaceLab as part of its environmental control system.

As described on Fox's internet website (currently at www URL foxvalve.com/frameset-venturi.html), if the venturi is designed such that a sonic shock wave forms in the throat of the venturi, the output flow rate is constant. Once that shock is established, nothing that happens downstream can influence the flow pattern going into the venturi (no downstream perturbations can propagate upstream), as long as the downstream pressure remains below about 88% of the upstream pressure. That means that once you have locked the venturi into one flow rate (by setting the upstream pressure and the opening cross-section area in the venturi), it is completely unaffected by anything downstream, unlike change-in-pressure (delta-P) devices. Flow rate is now fixed, stable, and repeatable, and is solely a function of upstream pressure and venturi, not delta-P.

As long as downstream pressures stay below 88% of upstream pressure, they can fluctuate wildly, while flow rates remain constant, stable, and repeatable. This is what is meant by "recovery"—the maximum ratio of downstream to upstream pressures (in pounds per square inch absolute (psia)) where flow through the nozzle remains choked (i.e., constant flow rate). In some embodiments, critical-flow venturies convert a pressure regulator into a flow regulator, since once you know the characteristic curve of the nozzle, you can set any flow you want simply by setting the inlet pressure to the nozzle. Downstream conditions are irrelevant. In some embodiments, flow rates can be determined theoretically through Fox nozzles to ±2%, although overall system accuracy will depend upon pressure controls and instrumentation.

CFV chokes have been around since Bernoulli so they are not new, and they are inexpensive. Complicated feedback and controls are not needed to generate a stable flow rate.

Fox Valve does not typically provide off-the-shelf stock CFVs, but rather every sonic choke is built to order, with a delivery of about 4–6 weeks. Standard materials are stainless, brass, Monel, and titanium. Standard styles include flange insert, tube insert, flanged, butt weld, and socket weld.

In some embodiments of the invention, CFVs made of plastic are used. In other embodiments, portions or all of such a plastic body are coated or plated with a metal such as nickel. In yet other embodiments, CFVs are made of ceramic, wood, glass, cermet, fiber-reinforced composites, or other suitable material.

Fox venturi valves are used with fluids with a sealing and operating temperature range from −300° F. to 500° F. Spring loaded TFE seals are used for cryogenic fluids like LOX (liquid oxygen) and LH2 (liquid hydrogen). Kalrez O-rings enable simple O-real sealing up to 500° F.

In some embodiments, standard valve bodies, in 300 series stainless are rated up to 3000 psig.

The effective throat area (CdA) is directly related to needle position. Carefully machined surfaces on the knob enable quick, precise measurement of a calibration reference dimension. Calibration then relates this external dimension to flow rate, defining a highly repeatable flow characteristic.

Adjustable area venturi valves can be calibrated to ±0.5 percent traceable to NIST (National Institute of Standards and Technology), establishing a CdA vs. valve position relationship. This data can then be used to predict flow of any fluid at any given inlet pressure. A less expensive calibration to ±2 percent is also available.

One aspect of the invention in some embodiments includes a fluid-flow controller (FFC) apparatus for emptying a pressure pot, the pressure pot having a conveying line connected to receive material removed from the pressure pot and a pressurization line connected to pressurize the pressure pot. The apparatus includes a first flow controller having an output that supplies fluid to the conveying line, a second flow controller having an output that supplies fluid to the pressurization line, and a controller operably coupled to the first flow controller and to the second flow controller. The controller, based on an increase in pressure in the conveying line, controls the second flow controller to cause a decrease in mass flow of fluid into the pressurization line.

In some embodiments, the second flow controller includes an adjustable critical-flow venturi used to adjust the mass flow of fluid into the pressurization line, and the first flow controller includes a critical-flow venturi.

In some embodiments of the apparatus, the controller, based on the increase in pressure in the conveying line, further controls the first flow controller to cause an increase in mass flow of fluid into the conveying line.

In some embodiments, the first flow controller includes an adjustable critical-flow venturi, the second flow controller includes an adjustable critical-flow venturi, and the controller, based on the increase in pressure in the conveying line, further controls the first flow controller to cause an increase in mass flow of fluid into the conveying line.

In some embodiments of the apparatus, the controller, based on the increase in pressure in the conveying line, further controls the first flow controller to cause an increase in mass flow of fluid into the conveying line. The amount of decrease in mass flow of fluid into the pressurization line substantially equals the amount of increase in mass flow of fluid into the conveying line.

In some embodiments, the first flow controller includes an adjustable critical-flow venturi, the second flow controller includes an adjustable critical-flow venturi, and the controller, based on the increase in pressure in the conveying line, further controls the first flow controller to cause an increase in mass flow of fluid into the conveying line. For a first amount of pressure change, the amount of decrease in mass flow of fluid into the pressurization line substantially equals the amount of increase in mass flow of fluid into the conveying line.

In some embodiments, one or more continuously adjustable critical-flow venturi, such as shown in FIGS. 3A, 3B, 3C, 4A, 4B, 4C, 5, 6, 7, 8A and/or 9 are used to adjust flow rates. Such continuously adjustable critical-flow venturis allow smooth continuous adjustments to be made to flow rates. In other embodiments, one or more discretely adjustable critical-flow venturis, such as shown in FIGS. 10A, 11A, 12A, 13A, and/or 14A are used to adjust flow rates. Such discretely adjustable critical-flow venturis allow discrete (non-continuous, or incrementing at a small quantum) adjustments to be made to flow rates.

In some embodiments, the first flow controller includes an adjustable critical-flow venturi (CFV), the second flow controller includes an adjustable critical-flow venturi, and the controller includes a pneumatic cylinder coupled to, based on the increase in pressure in the conveying line, move a first pintle in the first flow controller to cause an increase in mass flow of fluid into the conveying line and move a second pintle in the second flow controller to cause a decrease in mass flow of fluid into the pressurization line. For a first amount of pressure change, the amount of decrease in mass flow of fluid into the pressurization line substantially equals the amount of increase in mass flow of fluid into the conveying line.

In some such embodiments, the first pintle in the first flow controller is a tapered end of a shaft that is connected to a piston in the pneumatic cylinder, and the second pintle in the second flow controller is an opposite tapered end of the shaft, such that when the shaft moves the pintle in the first flow controller moves to increase an area of opening in its CFV, and the pintle in the second flow controller moves to decrease an equal area of opening in its CFV.

In some embodiments, for some point along each pintle, the difference between a cross-section area of the first pintle in the venturi's opening and a cross-section area of the venturi's opening at that point increases in direct proportion to an amount of linear motion of the shaft along its axis. The difference between a cross-section area of the second pintle in its venturi's opening and a cross-section area of the venturi's opening at that point decreases in direct proportion to the amount of linear motion of the shaft along its axis.

In some such embodiments, for some point along each pintle, rate of cross-section area decrease towards the end of the pintle follows a curve based on $x^2$ (where x is a distance along a longitudinal axis of the pintle).

In some embodiments, for at least a portion of a range of pressures in the conveying line, the rate of pressurization-line flow change per pressure change is a continuous function.

Some embodiments further include a third flow controller that injects a variable amount of additional downstream conveying fluid into the conveying line based on pressure feedback.

In some embodiments, pressurization flow is added to the pneumatic conveying system, at a plurality of different locations.

Another aspect of the invention includes a method for controlling emptying of a pressure pot. The pressure pot includes a conveying line connected to receive material removed from the pressure pot and a pressurization line connected to pressurize the pressure pot. This method includes supplying fluid at a first flow rate to the conveying line, supplying fluid at a second flow rate to the pressurization line, and, based on an increase in pressure in the conveying line, automatically adjusting a proportion of fluid flow into the pressurization line relative to the fluid flow into the conveying line.

In some embodiments, the method includes, based on an increase in pressure in the conveying line, automatically decreasing the mass-flow rate of fluid into the pressurization line.

In some embodiments, this method includes controlling the first mass-flow rate using a critical-flow venturi, and controlling the second mass-flow rate using an adjustable critical-flow venturi.

In some embodiments, this method further includes, based on the increase in pressure in the conveying line, automatically increasing the mass-flow rate of fluid into the conveying line.

In some embodiments, this method includes controlling the first mass-flow rate using an adjustable critical-flow venturi, controlling the second mass-flow rate using an adjustable critical-flow venturi, and based on the increase in pressure in the conveying line, automatically increasing the mass-flow rate of fluid into the conveying line.

In some such embodiments, this method includes, based on the increase in pressure in the conveying line, automatically increasing the mass-flow rate of fluid into the conveying line. The amount of decrease in mass flow of fluid into the pressurization line substantially equals the amount of increase in mass flow of fluid into the conveying line.

In some embodiments, this method includes controlling the first mass-flow rate using an adjustable critical-flow venturi, controlling the second mass-flow rate using an adjustable critical-flow venturi, and based on the increase in pressure in the conveying line, automatically increasing the mass-flow rate of fluid into the conveying line, wherein the amount of decrease in mass flow of fluid into the pressurization line substantially equals the amount of increase in mass flow of fluid into the conveying line.

In some embodiments, the method includes controlling the first mass-flow rate using a first adjustable critical-flow venturi, controlling the second mass-flow rate using a second adjustable critical-flow venturi, and based on the increase in pressure in the conveying line, automatically moving a first pintle to increase an opening area in the first critical-flow venturi, and moving a second pintle to decrease an opening area in the second critical-flow venturi.

In some embodiments, the first pintle in the first flow controller is a tapered end of a shaft that is connected to a piston in the pneumatic cylinder, and the second pintle in the second flow controller is an opposite tapered end of the shaft. The method includes moving the shaft such that the first pintle in the first flow controller moves -to increase an area of opening in its CFV, and the second pintle in the second flow controller moves to decrease an equal area of opening in its CFV.

In some such embodiments, for some point along each pintle, the difference between a cross-section area of the first pintle in the venturi's opening and a cross-section area of its venturi's opening at that point increases in direct proportion to an amount of linear motion of the shaft along its axis. The difference between a cross-section area of the second pintle in its venturi's opening and a cross-section area of the venturi's opening at that point decreases in direct proportion to the amount of linear motion of the shaft along its axis.

In some such embodiments, for some point along each pintle, rate of cross-section area decrease towards the end of the pintle follows a curve based on $\sin^2(x)+\cos^2(x)=1$.

In some embodiments, for at least a portion of a range of pressures in the conveying line, changing the rate of pressurization-line flow per pressure change is a continuous function.

In some embodiments, for at least a portion of a range of pressures in the conveying line, the rate of pressurization-line flow change per pressure change is constant.

Some embodiments further include injecting additional downstream conveying fluid into the output line based on pressure feedback.

Some embodiments further include supplying additional pressurization flow at a plurality of different locations of the pneumatic conveying system.

Another aspect of this invention, in some embodiments, includes a system that has a first critical-flow venturi (CFV), a second critical-flow venturi (CFV), and a cylinder piston (e.g., of a pneumatic cylinder that moves a piston based on an air pressure) operatively coupled to one or both of the CFVs to adjust a proportion of an opening area of the second CFV to an opening area of the first CFV based on a change in pressure at an output of the first CFV.

In some embodiments, the pneumatic cylinder is operatively coupled to the first CFV to increase an opening area in the first CFV based on an increase in pressure at the output of the first CFV, and is operatively coupled to the second CFV to decrease an opening area in the second CFV based on an increase in pressure at the output of the first CFV.

In some embodiments, the cylinder has a piston, and for each of a plurality of positions of the piston the amount of opening area increase in the first CFV is substantially equal to the amount of opening area decrease in the second CFV.

In some embodiments, the cylinder has a piston and at least one vent-inlet to dampen movement of the piston.

Another aspect of the invention, in some embodiments, is a system that includes a first critical-flow venturi (CFV), a second critical-flow venturi (CFV), and means for automatically adjusting a proportion of fluid flow into the pressurization line relative to the fluid flow into the conveying line based on a change in pressure in the conveying line.

In some embodiments, the system further includes means for increasing flow through the first CFV that is continuously variable for at least a portion of a range of pressures and flow rates.

Some embodiments include a system including a first critical-flow venturi (CFV), a second critical-flow venturi, and a pneumatic cylinder operatively coupled to the second CFV to decrease an opening area of the second CFV based on an increase in pressure at an output of the first CFV.

In some embodiments, the pneumatic cylinder is also operatively coupled to the first CFV to increase an opening area in the first CFV based on an increase in pressure at the output of the first CFV.

In some embodiments of the apparatus, the cylinder has a piston, and for each of a plurality of positions of the piston the amount of opening area increase in the first CFV is substantially equal to the amount of opening area decrease in the second CFV.

In some such embodiments, the cylinder has a piston and at least one vent-inlet to dampen movement of the piston.

Another aspect of the invention, in some embodiments, is a system including a first critical-flow venturi (CFV), a second critical-flow venturi (CFV), and means for decreasing mass flow through the second CFV based on an increase in pressure at an output of the first CFV.

In some embodiments, this system includes means for increasing mass flow through the first CFV based on an increase in pressure at the output of the first CFV.

In some embodiments of the apparatus, the means for increasing mass flow through the first CFV is continuously variable for at least a portion of a range of pressures and flow rates.

Another aspect of the invention is a fluid-flow controller (FFC) apparatus for emptying a pressure pot, the pressure pot having a conveying line connected to receive material removed from the pressure pot and a pressurization line connected to pressurize the pressure pot. In some embodiments, the apparatus includes a first flow controller having an output that supplies fluid to the conveying line, a second flow controller having an output that supplies fluid to the pressurization line, and a controller operably coupled to the first flow controller and to the second flow controller, wherein the controller, based on an increase in pressure in the conveying line, controls the first flow controller to cause a decrease in mass flow of fluid into the pressurization line.

In some embodiments, the first flow controller includes a critical-flow venturi, and the second flow controller includes an adjustable critical-flow venturi.

In some embodiments, the pressurization line is operatively coupled to supply pressurization flow at a plurality of different locations of the pneumatic conveying system.

Some embodiments further include one or more one-line fluid-flow controllers coupled to add a variable amount of fluid at downstream locations based on pressure feedback.

Another aspect of the invention includes a method for controlling emptying of a pressure pot, the pressure pot having a conveying line connected to receive material removed from the pressure pot and a pressurization line connected to pressurize the pressure pot. This includes supplying fluid at a first mass-flow rate to the conveying line, supplying fluid at a second mass-flow rate to the pressurization line, and based on an increase in pressure in the conveying line, automatically increasing the mass-flow rate of fluid into the conveying line.

In some such embodiments, this method further includes controlling the second mass-flow rate using a critical-flow venturi, and controlling the first mass-flow rate using an adjustable critical-flow venturi.

The method of claim 41, further comprising injecting additional downstream conveying fluid into the output line based on pressure feedback.

The method of claim 41, further comprising inserting pressurization flow to the pressure pot at a plurality of different locations.

Another aspect of the invention, in some embodiments, includes a fluid-flow controller (FFC) apparatus for emptying a dry-material container with a pneumatic-conveying system, the pneumatic-conveying system having a line connected to the container, the FFC comprising a flow controller having an output that adjusts a flow of fluid to the line based on a pressure in the line.

In some embodiments, the line coupled to the container is a conveying line.

In some embodiments, the flow controller, based on an increase in pressure in the conveying line, causes an increase in flow of fluid into the conveying line.

In some embodiments, the flow controller includes a continuously adjustable critical-flow venturi used to adjust the flow of fluid into the conveying line.

In some embodiments, the flow controller includes an adjustable critical-flow venturi and the controller includes a pneumatic cylinder coupled to, based on an increase in pressure in the conveying line, move a first pintle in the flow controller to cause an increase in flow of fluid into the conveying line.

In some embodiments, for some point along the first pintle, the difference between a cross-section area of the pintle in the venturi's opening and a cross-section area of the venturi's opening at that point increases in direct proportion to an amount of linear motion of a shaft along its axis.

In some embodiments, for some point along the first pintle, rate of cross-section area decrease towards the end of the pintle follows a curve based on $x^2$ (where x is a distance along a longitudinal axis of the pintle).

In some embodiments, for at least a portion of a range of pressures in the conveying line, a rate of conveying-line flow change per pressure change is a continuous function.

Some embodiments further include a second flow controller that injects a variable amount of additional downstream conveying fluid into the conveying line based on pressure feedback.

In some embodiments, the line coupled to the container is a pressurization line.

In some embodiments, the flow controller, based on an increase in pressure in the conveying line, causes a decrease in flow of fluid into the pressurization line.

In some embodiments, the flow controller includes an adjustable critical flow venturi used to adjust the flow of fluid into the pressurization line.

In some embodiments, the flow controller includes an adjustable critical-flow venturi and the controller includes a pneumatic cylinder coupled to, based on the increase in pressure in the conveying line, move a second pintle in the flow controller to cause a decrease in flow of fluid into the pressurization line.

In some embodiments, for some point along the second pintle, the difference between a cross-section area of the pintle in the venturi's opening and a cross-section area of the venturi's opening at that point increases in direct proportion to an amount of linear motion of a shaft along its axis.

In some embodiments, for some point along the second pintle, rate of cross-section area decrease towards the end of the pintle follows a curve based on $x^2$ (where x is a distance along a longitudinal axis of the pintle).

In some embodiments, the for at least a portion of a range of pressures in the conveying line, the rate of pressurization-line flow change per pressure change is a continuous function.

In some embodiments, pressurization flow is added to the pneumatic conveying system at a plurality of different locations.

Some embodiments further include a rotary valve that transfers material between the container and the pneumatic conveying system at rate based on a pressure in the line.

In some embodiments, the flow controller includes a discretely adjustable critical-flow venturi used to adjust the flow of fluid into the conveying line.

Another aspect of the invention, in some embodiments, includes a method for controlling emptying of a dry-material container using a pneumatic conveying system, the pneumatic conveying system having a conveying line connected to receive material removed from a container. This method includes supplying conveying fluid at a first flow rate to the conveying line, and controlling a rate of material transfer between the container and the pneumatic conveying system wherein, based on an increase in pressure in the conveying line, the rate of material transfer is automatically decreased.

In some embodiments, the controlling the rate of material transfer includes adjusting the rate of material transfer using a rotary valve.

Some embodiments further include controlling, based on pressure in the conveying line, the first flow rate using an adjustable critical-flow venturi.

Some embodiments further include injecting additional downstream conveying fluid into the conveying line based on pressure feedback.

Some embodiments further include inserting pressurization flow to the container.

Another aspect of the invention, in some embodiments, includes a fluid-flow controller apparatus for emptying a dry-material container with a pneumatic conveying system, the pneumatic conveying system having a conveying line connected to an output of the container, the apparatus comprising a material-transfer controller that adjusts a material-transfer rate from the container to the conveying line based on a pressure in the conveying line.

In some embodiments, the material-transfer controller includes a rotary valve controller that reduces the material-transfer rate based on an increase in the pressure in the conveying line.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third" etc., are used merely as labels, and are not intended to impose numerical requirements on their objects.

What is claimed is:

1. A fluid-flow controller (FFC) apparatus for controlling fluid flow for a pneumatic-conveying system, the pneumatic-conveying system having a conveying line connected to receive material removed from a pressure pot and a pressurization line connected to pressurize the pressure pot, the apparatus comprising:
   a first flow controller having an output that supplies fluid to the conveying line;
   a second flow controller having an output that supplies fluid to the pressurization line; and
   a non-electrical controller mechanically linked to control the first flow controller and to the second flow controller, wherein the controller, based on an increase in pressure in the conveying line, automatically decreases fluid flow into the pressurization line and increases fluid flow into the conveying line.

2. The apparatus of claim 1, wherein the second flow controller includes an adjustable critical-flow venturi used to adjust the flow of fluid into the pressurization line, and the first flow controller includes a critical-flow venturi.

3. The apparatus of claim 1, wherein the controller, based on the increase in pressure in the conveying line, further controls the first flow controller to cause an increase in flow of fluid into the conveying line.

4. The apparatus of claim 1, wherein the first flow controller includes an adjustable critical-flow venturi, the second flow controller includes an adjustable critical-flow venturi, and the controller, based on the increase in pressure in the conveying line, further controls the first flow controller to cause an increase in flow of fluid into the conveying line.

5. The apparatus of claim 1, wherein the controller, based on the increase in pressure in the conveying line, further controls the first flow controller to cause an increase in flow of fluid into the conveying line, wherein an amount of decrease in flow of fluid into the pressurization line substantially equals the amount of increase in flow of fluid into the conveying line.

6. The apparatus of claim 1, wherein the first flow controller includes an adjustable critical-flow venturi, the second flow controller includes an adjustable critical-flow venturi, and the controller, based on the increase in pressure in the conveying line, further controls the first flow controller to cause an increase in flow of fluid into the conveying line, wherein for a first amount of pressure change, an amount of decrease in flow of fluid into the pressurization line substantially equals the amount of increase in flow of fluid into the conveying line.

7. A fluid-flow controller (FFC) apparatus for controlling fluid flow for a pneumatic-conveying system, the pneumatic-conveying system having a conveying line connected to receive material removed from a pressure pot and a pressurization line connected to pressurize the pressure pot, the apparatus comprising:
   a first flow controller having an output that supplies fluid to the conveying line;
   a second flow controller having an output that supplies fluid to the pressurization line; and
   a controller operably coupled to the first flow controller and to the second flow controller, wherein the controller, based on an increase in pressure in the conveying line, automatically decreases fluid flow into the pressurization line and increases fluid flow into the conveying line, and wherein the first flow controller includes an adjustable critical-flow venturi (CFV), the second flow controller includes an adjustable critical-flow venturi, and the controller includes a pneumatic cylinder coupled to, based on the increase in pressure in the conveying line, move a first pintle in the first flow controller to cause an increase in flow of fluid into the conveying line and move a second pintle in the second flow controller to cause a decrease in flow of fluid into the pressurization line, wherein for a first amount of pressure change, the amount of decrease in flow of fluid into the pressurization line substantially equals the amount of increase in flow of fluid into the conveying line.

8. The apparatus of claim 7, wherein the first pintle in the first flow controller is a tapered end of a shaft that is connected to a piston in the pneumatic cylinder, and the second pintle in the second flow controller is an opposite tapered end of the shaft, such that when the shaft moves, the pintle in the first flow controller moves to increase an area of opening in its CFV, and the pintle in the second flow controller moves to decrease an equal area of opening in its CFV.

9. The apparatus of claim 7, wherein, for some point along each pintle, the difference between a cross-section area of the first pintle in the venturi's opening and a cross-section area of the venturi's opening at that point increases in direct proportion to an amount of linear motion of the shaft along its axis, while the difference between a cross-section area of the second pintle in its venturi's opening and a cross-section area of the venturi's opening at that point decreases in direct proportion to the amount of linear motion of the shaft along its axis.

10. The apparatus of claim 7, wherein, for some point along each pintle, rate of cross-section area decrease towards the end of the pintle follows a curve based on $x^2$ (where x is a distance along a longitudinal axis of the pintle).

11. The apparatus of claim 1, wherein, for at least a portion of a range of pressures in the conveying line, the rate of pressurization-line flow change per pressure change is a continuous function.

12. A fluid-flow controller (FFC) apparatus for controlling fluid flow for a pneumatic-conveying system, the pneumatic-conveying system having a conveying line connected to receive material removed from a pressure pot and a pressurization line connected to pressurize the pressure pot, the apparatus comprising:
a first flow controller having an output that supplies fluid to the conveying line;
a second flow controller having an output that supplies fluid to the pressurization line;
a controller operably coupled to the first flow controller and to the second flow controller, wherein the controller, based on an increase in pressure in the conveying line, automatically decreases fluid flow into the pressurization line and increases fluid flow into the conveying line, and
a third flow controller that injects a variable amount of additional downstream conveying fluid into the conveying line based on pressure feedback.

13. The apparatus of claim 1, wherein pressurization flow is added to the pneumatic conveying system at a plurality of different locations.

14. A fluid-flow controller (FFC) apparatus for emptying a pressure pot using a pneumatic conveying system, the pneumatic conveying system having a conveying line connected to receive material removed from a pressure pot and a pressurization line connected to pressurize the pressure pot, the apparatus comprising:
a first flow controller having an output that supplies fluid to the conveying line;
a second flow controller having an output that supplies fluid to the pressurization line;
a non-electrical controller mechanically linked to control the first flow controller and to the second flow controller, wherein the controller, based on an increase in pressure in the conveying line, controls the second flow controller to cause a decrease in flow of fluid into the pressurization line.

15. The apparatus of claim 14, wherein the first flow controller includes a critical-flow venturi, and the second flow controller includes an adjustable critical-flow venturi.

16. The apparatus of claim 14, wherein the pressurization line is operatively coupled to supply pressurization flow at a plurality of different locations of the pneumatic conveying system.

17. The apparatus of claim 14, further comprising one or more one-line fluid-flow controllers coupled to add a variable amount of fluid at downstream locations based on pressure feedback.

18. The apparatus of claim 12, wherein the second flow controller includes an adjustable critical-flow venturi used to adjust the flow of fluid into the pressurization line, and the first flow controller includes a critical-flow venturi.

19. The apparatus of claim 12, wherein the controller, based on the increase in pressure in the conveying line, further controls the first flow controller to cause an increase in flow of fluid into the conveying line.

20. The apparatus of claim 12, wherein the first flow controller includes an adjustable critical-flow venturi, the second flow controller includes an adjustable critical-flow venturi, and the controller, based on the increase in pressure in the conveying line, further controls the first flow controller to cause an increase in flow of fluid into the conveying line.

21. The apparatus of claim 12, wherein the controller, based on the increase in pressure in the conveying line, further controls the first flow controller to cause an increase in flow of fluid into the conveying line, wherein an amount of decrease in flow of fluid into the pressurization line substantially equals the amount of increase in flow of fluid into the conveying line.

22. The apparatus of claim 12, wherein the first flow controller includes an adjustable critical-flow venturi, the second flow controller includes an adjustable critical-flow venturi, and the controller, based on the increase in pressure in the conveying line, further controls the first flow controller to cause an increase in flow of fluid into the conveying line, wherein for a first amount of pressure change, an amount of decrease in flow of fluid into the pressurization line substantially equals the amount of increase in flow of fluid into the conveying line.

23. The apparatus of claim 12, wherein the first flow controller includes an adjustable critical-flow venturi (CFV), the second flow controller includes an adjustable critical-flow venturi, and the controller includes a pneumatic cylinder coupled to, based on the increase in pressure in the conveying line, move a first pintle in the first flow controller to cause an increase in flow of fluid into the conveying line and move a second pintle in the second flow controller to cause a decrease in flow of fluid into the pressurization line, wherein for a first amount of pressure change, the amount of decrease in flow of fluid into the pressurization line substantially equals the amount of increase in flow of fluid into the conveying line.

24. The apparatus of claim 23, wherein the first pintle in the first flow controller is a tapered end of a shaft that is connected to a piston in the pneumatic cylinder, and the second pintle in the second flow controller is an opposite tapered end of the shaft, such that when the shaft moves, the pintle in the first flow controller moves to increase an area of opening in its CFV, and the pintle in the second flow controller moves to decrease an equal area of opening in its CFV.

25. The apparatus of claim 23, wherein, for some point along each pintle, the difference between a cross-section area of the first pintle in the venturi's opening and a cross-section area of the venturi's opening at that point increases in direct proportion to an amount of linear motion of the shaft along its axis, while the difference between a cross-section area of the second pintle in its venturi's opening and a cross-section area of the venturi's opening at that point decreases in direct proportion to the amount of linear motion of the shaft along its axis.

26. The apparatus of claim 23, wherein, for some point along each pintle, rate of cross-section area decrease towards the end of the pintle follows a curve based on $x^2$ (where x is a distance along a longitudinal axis of the pintle).

27. The apparatus of claim 23, wherein, for some point along each pintle, rate of cross-section area decrease towards the end of the pintle follows a curve based on $sine^2(x) + cosine^2(x) = 1$.

28. The apparatus of claim 12, wherein, for at least a portion of a range of pressures in the conveying line, the rate of pressurization-line flow change per pressure change is a continuous function.

29. The apparatus of claim 12, wherein conveying flow is added to the conveying line at a plurality of different locations.

30. The apparatus of claim 12, wherein the first flow controller includes a discretely adjustable critical-flow venturi used to adjust the flow of fluid into the conveying line.

31. The apparatus of claim 12, wherein the second flow controller includes a discretely adjustable critical-flow venturi used to adjust the flow of fluid into the pressurization line.

32. The apparatus of claim 12, wherein the first flow controller includes a discretely adjustable critical-flow venturi used to adjust the flow of fluid into the conveying line, and the second flow controller includes a discretely adjustable critical-flow venturi used to adjust the flow of fluid into the pressurization line.

33. The apparatus of claim 7, wherein the controller is pneumatically operated.

34. The apparatus of claim 7, wherein conveying flow is added to the conveying line at a plurality of different locations.

35. The apparatus of claim 7, wherein the controller, further controls the first flow controller and second flow controllers such that an amount of decrease in flow of fluid into the pressurization line substantially equals the amount of increase in flow of fluid into the conveying line.

36. The apparatus of claim 7, wherein the controller, based on the increase in pressure in the conveying line, further controls the first and second flow controllers such that, for a first amount of pressure change, an amount of decrease in flow of fluid into the pressurization line substantially equals the amount of increase in flow of fluid into the conveying line.

37. The apparatus of claim 7, wherein, for at least a portion of a range of pressures in the conveying line, the rate of pressurization-line flow change per pressure change is a continuous function.

38. The apparatus of claim 7, wherein pressurization flow is added to the pneumatic conveying system at a plurality of different locations.

39. The apparatus of claim 7, wherein the controller is pneumatically operated.

40. The apparatus of claim 7, wherein the first flow controller includes a discretely adjustable critical-flow venturi used to adjust the flow of fluid into the conveying line.

41. The apparatus of claim 7, wherein, for some point along each pintle, rate of cross-section area decrease towards the end of the pintle follows a curve based on $sine^2(x) + cosine^2(x) = 1$.

42. The apparatus of claim 7, wherein the first flow controller includes a discretely adjustable critical-flow venturi used to adjust the flow of fluid into the conveying line, and the second flow controller includes a discretely adjustable critical-flow venturi used to adjust the flow of fluid into the pressurization line.

43. The apparatus of claim 1, wherein conveying flow is added to the conveying line at a plurality of different locations.

44. The apparatus of claim 1, wherein the controller is pneumatically operated.

45. The apparatus of claim 1, wherein the first flow controller includes a discretely adjustable critical-flow venturi used to adjust the flow of fluid into the conveying line.

46. The apparatus of claim 1, wherein the second flow controller includes a discretely adjustable critical-flow venturi used to adjust the flow of fluid into the pressurization line.

47. The apparatus of claim 1, wherein the first flow controller includes a discretely adjustable critical-flow venturi used to adjust the flow of fluid into the conveying line, and the second flow controller includes a discretely adjustable critical-flow venturi used to adjust the flow of fluid into the pressurization line.

48. The apparatus of claim 14, wherein the first flow controller includes an adjustable critical-flow venturi and the second flow controller includes an adjustable critical-flow venturi.

49. The apparatus of claim 14, wherein the controller, based on the increase in pressure in the conveying line, further controls the first and second flow controllers such that an amount of decrease in flow of fluid into the pressurization line substantially equals the amount of increase in flow of fluid into the conveying line.

50. The apparatus of claim 14, wherein the first flow controller includes an adjustable critical-flow venturi, the second flow controller includes an adjustable critical-flow venturi, and the controller, based on the increase in pressure in the conveying line, further controls the first flow controller to cause an amount of increase in flow of fluid into the conveying line, wherein for a first amount of pressure change, an amount of decrease in flow of fluid into the pressurization line substantially equals the amount of increase in flow of fluid into the conveying line.

51. The apparatus of claim 14, wherein the first flow controller includes an adjustable critical-flow venturi (CFV), the second flow controller includes an adjustable critical-flow venturi, and the controller includes a pneumatic cylinder coupled to, based on the increase in pressure in the conveying line, move a first pintle in the first flow controller to cause an increase in flow of fluid into the conveying line and move a second pintle in the second flow controller to cause a decrease in flow of fluid into the pressurization line, wherein for a first amount of pressure change, the amount of decrease in flow of fluid into the pressurization line substantially equals the amount of increase in flow of fluid into the conveying line.

52. The apparatus of claim 51, wherein the first pintle in the first flow controller is a tapered end of a shaft that is connected to a piston in the pneumatic cylinder, and the second pintle in the second flow controller is an opposite tapered end of the shaft, such that when the shaft moves, the pintle in the first flow controller moves to increase an area of opening in its CFV, and the pintle in the second flow controller moves to decrease an equal area of opening in its CFV.

53. The apparatus of claim 51, wherein, for some point along each pintle, the difference between a cross-section area of the first pintle in the venturi's opening and a cross-section area of the venturi's opening at that point increases in direct proportion to an amount of linear motion of the shaft along its axis, while the difference between a cross-section area of the second pintle in its venturi's opening and a cross-section area of the venturi's opening at that point decreases in direct proportion to the amount of linear motion of the shaft along its axis.

54. The apparatus of claim 51, wherein, for some point along each pintle, rate of cross-section area decrease towards the end of the pintle follows a curve based on $x^2$ (where x is a distance along a longitudinal axis of the pintle).

55. The apparatus of claim 14, wherein, for at least a portion of a range of pressures in the conveying line, the rate of pressurization-line flow change per pressure change is a continuous function.

56. The apparatus of claim 14, wherein pressurization flow is added to the pneumatic conveying system at a plurality of different locations.

57. The apparatus of claim 14, wherein pressurization flow is added to the pneumatic conveying system at a plurality of different locations.

58. The apparatus of claim 14, wherein the first flow controller includes a discretely adjustable critical-flow venturi used to adjust the flow of fluid into the conveying line.

59. The apparatus of claim 14, wherein the second flow controller includes a discretely adjustable critical-flow venturi used to adjust the flow of fluid into the pressurization line.

60. The apparatus of claim 14, wherein the first flow controller includes a discretely adjustable critical-flow venturi used to adjust the flow of fluid into the conveying line, and the second flow controller includes a discretely adjustable critical-flow venturi used to adjust the flow of fluid into the pressurization line.

61. An apparatus for controlling fluid flow for a pneumatic-conveying system, the pneumatic-conveying system having a conveying line connected to receive material removed from a pressure pot and a pressurization line connected to pressurize the pressure pot, the apparatus comprising:
a first flow controller having an output that supplies fluid to the conveying line;
a second flow controller having an output that supplies fluid to the pressurization line; and
a non-electrical controller that is mechanically linked to control the first flow controller and to the second flow controller, wherein the controller, based on an increase in pressure in the conveying line, automatically increases fluid flow into the conveying line.

62. The apparatus of claim 61, wherein the first flow controller includes an adjustable critical-flow venturi, the second flow controller includes an adjustable critical-flow venturi, and the controller is a pneumatically operated controller that, based on the increase in pressure in the conveying line, further controls the first flow controller to cause an increase in flow of fluid into the conveying line, wherein for a first amount of pressure change, an amount of decrease in flow of fluid into the pressurization line substantially equals the amount of increase in flow of fluid into the conveying line.

63. An apparatus for controlling fluid flow for a pneumatic-conveying system, the pneumatic-conveying system having a conveying line connected to receive material removed from a pressure pot and a pressurization line connected to pressurize the pressure pot, the apparatus comprising:
a first flow controller having an output that supplies fluid to the conveying line;
a second flow controller having an output that supplies fluid to the pressurization line; and
a pneumatically operated controller that is operably connected to non-electrically control the first flow controller and to the second flow controller, wherein the controller, based on an increase in pressure in the conveying line, automatically increases fluid flow into the conveying line.

64. The apparatus of claim 63, wherein the first flow controller includes an adjustable critical-flow venturi, the second flow controller includes an adjustable critical-flow venturi, and the controller operates such that an amount of decrease in controlled flow of fluid into the pressurization line substantially equals the amount of increase in controlled flow of fluid into the conveying line.

65. An apparatus for controlling fluid flow for a pneumatic-conveying system, the pneumatic-conveying system having a conveying line connected to receive material removed from a pressure pot and a pressurization line connected to pressurize the pressure pot, the apparatus comprising:
a first flow controller having an output that supplies fluid to the conveying line;
a second flow controller having an output that supplies fluid to the pressurization line; and
a pneumatic cylinder operably connected to control the first flow controller and to the second flow controller, wherein the cylinder, based on an increase in pressure in the conveying line, automatically increases fluid flow into the conveying line.

66. The apparatus of claim 65, wherein the first flow controller includes an adjustable critical-flow venturi, the second flow controller includes an adjustable critical-flow venturi, and the cylinder operates such that an amount of decrease in controlled flow of fluid into the pressurization line substantially equals the amount of increase in controlled flow of fluid into the conveying line.

67. An apparatus for controlling fluid flow for a pneumatic-conveying system, the pneumatic-conveying system having a conveying line connected to receive material removed from a pressure pot and a pressurization line connected to pressurize the pressure pot, the apparatus comprising:
a first adjustable critical-flow venturi having an output that supplies fluid to the conveying line;
a second adjustable critical-flow venturi having an output that supplies fluid to the pressurization line; and
a pneumatic cylinder operably connected to control the first adjustable critical-flow venturi and to the second adjustable critical-flow venturi, wherein the cylinder, based on an increase in pressure in the conveying line, automatically increases fluid flow into the conveying line.

68. The apparatus of claim 67, wherein the first adjustable critical-flow venturi includes a discretely adjustable critical-flow venturi used to adjust the flow of fluid into the conveying line, and the second adjustable critical-flow venturi includes a discretely adjustable critical-flow venturi used to adjust the flow of fluid into the pressurization line.

69. An apparatus for controlling fluid flow for a pneumatic-conveying system, the pneumatic-conveying system having a conveying line connected to receive material removed from a pressure pot and a pressurization line connected to pressurize the pressure pot, the apparatus comprising:
   a first continuously adjustable critical-flow venturi flow controller having an output that supplies fluid to the conveying line;
   a second continuously adjustable critical-flow venturi flow controller having an output that supplies fluid to the pressurization line; and
   a pneumatic cylinder operably connected to control the first continuously adjustable critical-flow venturi and to the second continuously adjustable critical-flow venturi, wherein the cylinder, based on an increase in pressure in the conveying line, automatically increases fluid flow into the conveying line.

70. The apparatus of claim 69, further comprising:
   the pressure pot; and
   a vehicle configured to carry the pressure pot, the first and second continuously adjustable critical-flow venturi flow controllers and the cylinder.

* * * * *